US011523346B2

(12) United States Patent
Rajagopal et al.

(10) Patent No.: US 11,523,346 B2
(45) Date of Patent: *Dec. 6, 2022

(54) POWER CONTROL IN WIRELESS COMMUNICATIONS

(71) Applicant: AltioStar Networks, Inc., Tewksbury, MA (US)

(72) Inventors: Sriram Rajagopal, Bangalore (IN); Raghunath Hariharan, Boston, MA (US); Ran Yaniv, Bedford, MA (US)

(73) Assignee: Altiostar Networks, Inc., Tewksbury, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/816,839

(22) Filed: Mar. 12, 2020

(65) Prior Publication Data

US 2020/0213950 A1 Jul. 2, 2020

Related U.S. Application Data

(63) Continuation of application No. 15/377,551, filed on Dec. 13, 2016, now Pat. No. 10,624,034.

(51) Int. Cl.
*H04W 52/14* (2009.01)
*H04L 5/00* (2006.01)
(Continued)

(52) U.S. Cl.
CPC ......... *H04W 52/146* (2013.01); *H04L 5/0053* (2013.01); *H04L 5/0073* (2013.01);
(Continued)

(58) Field of Classification Search
CPC ... H04L 5/0032; H04L 5/0033; H04L 5/0053; H04L 5/0073; H04W 72/0426; H04W 72/0413

See application file for complete search history.

(56) References Cited

U.S. PATENT DOCUMENTS 5,923,650 A 7/1999 Chen et al.
8,531,947 B2 9/2013 Zhao et al.
(Continued)

FOREIGN PATENT DOCUMENTS

CN 101379839 A 3/2009
CN 102396262 A 3/2012
(Continued)

OTHER PUBLICATIONS

International Search Report issued in International Application No. PCT/US2016/017585, dated Dec. 20, 2016, 12 pages.
(Continued)

*Primary Examiner* — Hassan Kizou
*Assistant Examiner* — Hector Reyes
(74) *Attorney, Agent, or Firm* — Mintz Levin Cohn Ferris Glovsky and Popeo, P.C.

(57) ABSTRACT

A system, a method, and a computer program product for power control using uplink coordinated multi-point transmission in a wireless communications system are provided. Using a first node, at least one second node configured to provide an uplink support to user equipment communicating with the first node is detected. The first node receives a confirmation from the second node indicating availability of uplink support by the second node to the user equipment. Based on the received confirmation, communicating with the user equipment on an uplink using the second node is established.

20 Claims, 15 Drawing Sheets

(51) Int. Cl.
*H04W 88/08* (2009.01)
*H04W 52/40* (2009.01)

(52) U.S. Cl.
CPC ............ *H04L 5/0032* (2013.01); *H04W 52/40* (2013.01); *H04W 88/085* (2013.01)

(56) References Cited

U.S. PATENT DOCUMENTS

| | | | |
|---|---|---|---|
| 8,804,744 B2 | 8/2014 | Gao et al. | |
| 9,288,823 B2 | 3/2016 | Lei et al. | |
| 9,439,095 B2 | 9/2016 | He et al. | |
| 9,504,029 B2 | 11/2016 | Yang et al. | |
| 9,554,375 B1* | 1/2017 | Srinivas | H04W 24/10 |
| 9,788,307 B2 | 10/2017 | Yang et al. | |
| 9,813,219 B2 | 11/2017 | Yang et al. | |
| 10,009,803 B2 | 6/2018 | Dahod et al. | |
| 10,326,569 B2 | 6/2019 | Nguyen | |
| 10,492,110 B2 | 11/2019 | Dahod et al. | |
| 10,499,413 B2 | 12/2019 | Nguyen et al. | |
| 10,624,034 B2 | 4/2020 | Rajagopal et al. | |
| 10,791,481 B2 | 9/2020 | Nguyen et al. | |
| 10,959,134 B2 | 3/2021 | Dahod et al. | |
| 2002/0172178 A1 | 11/2002 | Suzuki et al. | |
| 2003/0235171 A1 | 12/2003 | Lundstrom et al. | |
| 2009/0201813 A1 | 8/2009 | Speight | |
| 2009/0201875 A1 | 8/2009 | Hasegawa et al. | |
| 2009/0219951 A1 | 9/2009 | Chun et al. | |
| 2009/0252148 A1 | 10/2009 | Dolganow et al. | |
| 2010/0054231 A1 | 3/2010 | Dolganow et al. | |
| 2010/0062781 A1 | 3/2010 | Dolganow et al. | |
| 2010/0067489 A1 | 3/2010 | Pelletier et al. | |
| 2010/0113000 A1 | 5/2010 | Yao | |
| 2010/0260096 A1 | 10/2010 | Ulupinar et al. | |
| 2010/0260097 A1 | 10/2010 | Ulupinar et al. | |
| 2011/0034175 A1* | 2/2011 | Fong | H04W 72/042 455/450 |
| 2011/0242975 A1 | 10/2011 | Zhao et al. | |
| 2011/0267951 A1 | 11/2011 | Stanwood et al. | |
| 2011/0310839 A1 | 12/2011 | Kenington et al. | |
| 2012/0157108 A1 | 6/2012 | Boudreau et al. | |
| 2012/0163298 A1 | 6/2012 | Zhou et al. | |
| 2012/0188953 A1 | 7/2012 | Won et al. | |
| 2012/0230248 A1 | 9/2012 | Gao et al. | |
| 2012/0257581 A1 | 10/2012 | De | |
| 2012/0263120 A1 | 10/2012 | Gopalakrishnan et al. | |
| 2012/0300710 A1 | 11/2012 | Li et al. | |
| 2012/0300747 A1 | 11/2012 | Westberg et al. | |
| 2013/0021929 A1* | 1/2013 | Kim | H04W 76/15 370/332 |
| 2013/0051329 A1 | 2/2013 | Take | |
| 2013/0083730 A1* | 4/2013 | Gaal | H04W 52/244 370/328 |
| 2013/0163524 A1 | 6/2013 | Shalzkamer et al. | |
| 2013/0188619 A1 | 7/2013 | Dinan | |
| 2013/0201890 A1 | 8/2013 | Swaminathan et al. | |
| 2013/0223272 A1* | 8/2013 | Tao | H04B 7/024 370/252 |
| 2013/0272181 A1 | 10/2013 | Fong et al. | |
| 2013/0301609 A1 | 11/2013 | Smith et al. | |
| 2014/0010125 A1 | 1/2014 | Tillman et al. | |
| 2014/0018090 A1 | 1/2014 | Khoryaev et al. | |
| 2014/0029458 A1* | 1/2014 | Ye | H04L 5/0053 370/252 |
| 2014/0031049 A1 | 1/2014 | Sundaresan et al. | |
| 2014/0043980 A1 | 2/2014 | Anthony, Jr. et al. | |
| 2014/0120936 A1 | 5/2014 | Chen et al. | |
| 2014/0120947 A1 | 5/2014 | Siomina | |
| 2014/0204895 A1 | 7/2014 | Frederiksen et al. | |
| 2014/0226481 A1 | 8/2014 | Dahod et al. | |
| 2014/0233413 A1 | 8/2014 | Dahod et al. | |
| 2014/0233459 A1 | 8/2014 | Dahod et al. | |
| 2014/0233479 A1 | 8/2014 | Dahod et al. | |
| 2015/0009845 A1* | 1/2015 | Takano | H04W 52/46 370/336 |
| 2015/0009923 A1 | 1/2015 | Lei et al. | |
| 2015/0029965 A1 | 1/2015 | Aminaka et al. | |
| 2015/0085800 A1* | 3/2015 | Sivanesan | H04L 1/1887 370/329 |
| 2015/0312904 A1 | 10/2015 | Ma et al. | |
| 2015/0326456 A1 | 11/2015 | Dudda et al. | |
| 2015/0327236 A1 | 11/2015 | Lin | |
| 2015/0341923 A1 | 11/2015 | Yang et al. | |
| 2016/0057687 A1* | 2/2016 | Horn | H04W 28/10 370/331 |
| 2016/0057768 A1 | 2/2016 | Sun et al. | |
| 2016/0073299 A1 | 3/2016 | Liang et al. | |
| 2016/0182286 A1 | 6/2016 | Lunden et al. | |
| 2016/0212790 A1 | 7/2016 | Fujishiro et al. | |
| 2016/0353430 A1 | 12/2016 | Chen et al. | |
| 2017/0048912 A1 | 2/2017 | Sharma et al. | |
| 2017/0054477 A1* | 2/2017 | Natarajan | H04J 11/0093 |
| 2017/0181156 A1 | 6/2017 | Nguyen | |
| 2017/0295517 A1* | 10/2017 | Nguyen | H04W 72/1273 |
| 2017/0295591 A1 | 10/2017 | Nguyen et al. | |
| 2017/0318577 A1 | 11/2017 | Yang et al. | |
| 2018/0035436 A1 | 2/2018 | Sharma et al. | |
| 2018/0077587 A1 | 3/2018 | Al-fanek et al. | |
| 2018/0123920 A1 | 5/2018 | Dudda et al. | |
| 2018/0167889 A1 | 6/2018 | Rajagopal et al. | |
| 2018/0206173 A1 | 7/2018 | Virtej et al. | |
| 2018/0310207 A1 | 10/2018 | Dahod et al. | |
| 2018/0332496 A1 | 11/2018 | Dudda et al. | |
| 2019/0123806 A1* | 4/2019 | Aryafar | H04L 5/14 |
| 2020/0053605 A1 | 2/2020 | Dahod et al. | |
| 2020/0137778 A1 | 4/2020 | Nguyen et al. | |
| 2021/0112453 A1 | 4/2021 | Nguyen et al. | |
| 2021/0345189 A1 | 11/2021 | Dahod et al. | |

FOREIGN PATENT DOCUMENTS

| | | |
|---|---|---|
| CN | 104137644 A | 11/2014 |
| EP | 1 189 388 A2 | 3/2002 |
| EP | 2 200 390 A2 | 6/2010 |
| EP | 2 501 141 A2 | 9/2012 |
| EP | 2 523 505 A1 | 11/2012 |
| EP | 2 530 988 A1 | 12/2012 |
| EP | 2 747 376 A1 | 6/2014 |
| EP | 2 947 903 A1 | 11/2015 |
| GB | 2525935 A | 11/2015 |
| JP | 2010-128604 A | 6/2010 |
| JP | 2011-254415 A | 12/2011 |
| JP | 2012-523805 A | 10/2012 |
| JP | 2014-515584 A | 6/2014 |
| WO | 2010/120828 A1 | 10/2010 |
| WO | 2011/080714 A2 | 7/2011 |
| WO | 2011/152131 A1 | 12/2011 |
| WO | 2012/084636 A1 | 6/2012 |
| WO | 2012/139016 A2 | 10/2012 |
| WO | 2012/139664 A1 | 10/2012 |
| WO | 2012/163726 A1 | 12/2012 |
| WO | 2012/177763 A2 | 12/2012 |
| WO | 2013/029251 A1 | 3/2013 |
| WO | 2013/038167 A2 | 3/2013 |
| WO | 2013/116988 A1 | 8/2013 |
| WO | 2014/127054 A1 | 8/2014 |
| WO | 2014/130708 A1 | 8/2014 |
| WO | 2014/130709 A1 | 8/2014 |
| WO | 2014/130713 A1 | 8/2014 |
| WO | 2014/160709 A2 | 10/2014 |
| WO | 2014/160718 A1 | 10/2014 |
| WO | 2014/160722 A1 | 10/2014 |
| WO | 2015/167546 A1 | 11/2015 |
| WO | 2017/005854 A1 | 1/2017 |
| WO | 2017/106711 A1 | 6/2017 |
| WO | 2017/177223 A1 | 10/2017 |
| WO | 2017/177224 A1 | 10/2017 |

OTHER PUBLICATIONS

International Search Report and Written Opinion issued in International Application No. PCT/US2016/067271, dated Mar. 16, 2017, 11 pages . . . .

(56) References Cited

OTHER PUBLICATIONS

International Search Report and Written Opinion issued in International Application No. PCT/US2017/026792, dated Jul. 17, 2017, 11 pages.
International Search Report and Written Opinion issued in International Application No. PCT/US2017/026793, dated Aug. 18, 2017, 9 pages.
International Search Report and Written Opinion received for PCT Patent International Application No. PCT/JS2014/031725, dated Oct. 7, 2014, 9 Pages.
International Search Report Issued in International Application No. PCT/US2014/016123, dated Jul. 22, 2014, 9 pages.
International Search Report received for PCT Patent International Application No. PCT/US2014/017456, dated Jul. 3, 2014, 09 Pages.
International Search Report received for PCT Patent International Application No. PCT/US2014/017459, dated Jul. 3, 2014, 09 Pages.
International Search Report received for PCT Patent International Application No. PCT/US2014/017464, dated Jun. 16, 2014, 09 Pages.
International Search Report received for PCT Patent International Application No. PCT/US2014/031744, dated Sep. 4, 2014, 08 Pages.
International Search Report received for PCT Patent International Application No. PCT/US2014/031749, dated Aug. 5, 2014, 10 Pages.
International Search Report received for PCT Patent International Application No. PCT/US2014/031753, dated Aug. 14, 2014, 11 Pages.
Balakrishnan et al. (Dec. 1995) "Improving Reliable Transport and Handoff Performance in Cellular Wireless Networks", ACM Wireless Networks Journal, 1(4):19 pages.
Border et al. (Jun. 2001) "Performance Enhancing Proxies Intended to Mitigate Link-Related Degradations", Network Working Group, 45 pages.
CATT (Aug. 19-23, 2013) "L1 Support for Dual Connectivity", 3GPP TSG RAN WG1 Meeting #74, R1-133026, 3 pages.
Du et al. (Aug. 2009) "Downlink Scheduling for Multimedia Multicast/Broadcast Over Mobile Wimax: Connection-Oriented Multistate Adaptation", IEEE Wireless Communications, 72-79.
Huawei (Mar. 31-Apr. 4, 2014) "Flow Control for Split Bearers", 3GPP TSG RAN WG3 Meeting #83bis, R3-140560, 4 pages.
Kuwano et al. (Jan. 2013) "Optical Access Technologies for Mobile Radio Access Network", IEICE Technical Report, 112(401):121-125.
Yoon et al. (Aug. 22-26, 2012) "MuVi: A Multicast Video Delivery Scheme for 4G Cellular Networks", Mobile Computing and Networking, Association for Computing Machinery, 209-220.

\* cited by examiner

POWER CONTROL IN WIRELESS COMMUNICATIONS

CROSS-REFERENCE TO RELATED APPLICATIONS

The present application is a continuation of and claims priority to U.S. patent application Ser. No. 15/377,551 (now U.S. Patent No. 10,624,034) to Rajagopal et al., filed on Dec. 13, 2016, and entitled "Power Control in Wireless Communications", and incorporates its disclosure herein by reference in its entirety.

TECHNICAL FIELD

The subject matter described herein generally relates to data processing and in particular, to power control using uplink coordinated multi-point ("CoMP") transmission in a wireless communications system, such as a long term evolution network.

BACKGROUND

In today's world, cellular networks provide on-demand communications capabilities to individuals and business entities. Typically, a cellular network is wireless network that can be distributed over land areas, which are called cells. Each such cell is served by at least one fixed-location transceiver, which is referred to as a cell site or a base station. Each cell can use a different set of frequencies than its neighbor cells in order to avoid interference and provide improved service within each cell. When cells are joined together, they provide radio coverage over a wide geographic area, which enables a large number of mobile telephones, and/or other wireless devices or portable transceivers to communicate with each other and with fixed transceivers and telephones anywhere in the network. Such communications are performed through base stations and are accomplished even if when mobile transceivers are moving through more than one cell during transmission. Major wireless communications providers have deployed such cell sites throughout the world, thereby allowing communications mobile phones and mobile computing devices to be connected to the public switched telephone network and public Internet.

A mobile telephone is a portable telephone that is capable of receiving and/or making telephone and/or data calls through a cell site or a transmitting tower by using radio waves to transfer signals to and from the mobile telephone. In view of a large number of mobile telephone users, current mobile telephone networks provide a limited and shared resource. In that regard, cell sites and handsets can change frequency and use low power transmitters to allow simultaneous usage of the networks by many callers with less interference. Coverage by a cell site can depend on a particular geographical location and/or a number of users that can potentially use the network. For example, in a city, a cell site can have a range of up to approximately ½ mile; in rural areas, the range can be as much as 5 miles; and in some areas, a user can receive signals from a cell site 25 miles away.

The following are examples of some of the digital cellular technologies that are in use by the communications providers: Global System for Mobile Communications ("GSM"), General Packet Radio Service ("GPRS"), cdmaOne, CDMA2000, Evolution-Data Optimized ("EV-DO"), Enhanced Data Rates for GSM Evolution ("EDGE"), Universal Mobile Telecommunications System ("UMTS"), Digital Enhanced Cordless Telecommunications ("DECT"), Digital AMPS ("IS-136/TDMA"), and Integrated Digital Enhanced Network ("iDEN"). The Long Term Evolution, or 4G LTE, which was developed by the Third Generation Partnership Project ("3GPP") standards body, is a standard for a wireless communication of high-speed data for mobile phones and data terminals. A 5G LTE standard is currently being developed. LTE is based on the GSM/EDGE and UMTS/HSPA digital cellular technologies and allows for increasing capacity and speed by using a different radio interface together with core network improvements.

Communications between users in existing digital cellular networks are typically defined and/or affected by various factors and/or parameters. These can include latency. Latency can be measured as either one-way (the time from the source sending a packet to the destination receiving it), or a round-trip delay time (the one-way latency from source to destination plus the one-way latency from the destination back to the source). While the existing LTE systems were designed to increase speed of communications by reducing significant latency that plagued its predecessors, such systems are still affected by a substantial amount of latency when mobile users setup communications via the LTE systems. Further, the current LTE systems involve components that are costly and expensive to install and maintain.

To provide effective communication for the users and improve signal reception on an uplink, coordinated multi-point transmission features can be implemented in the wireless networks. Using coordinated multipoint transmission, it is possible to transmit data to and from user equipment from several network nodes so that best possible performance can be achieved. This feature enables coordination among nodes in the network so that overall quality of communications and utilization of the network can be improved. However, currently available solutions are limited in that such coordination is typically restricted to network nodes that are adjacent to one another and do not determine which nodes in the network may provide a better uplink support. Further, using conventional solutions, any improved performance, including signal gains, are limited to specific locations of user equipment (e.g., at sector edge). Thus, there is a need to provide a better inter-site and/or intra-site coordinated multipoint transmission in order to allow for effective uplink support, reduction of power consumption by user equipment, improved throughput and quality of service.

SUMMARY

In some implementations, the current subject matter relates to a computer implemented method for power control in wireless communications networks. The method ca includes detecting, using a first node, at least one second node configured to provide an uplink support to at least one user equipment communicating with the first node, receiving, by the first node, a confirmation from the at least one second node indicating availability of uplink support by the at least one second node to the at least one user equipment, and communicating, based on the received confirmation, with the at least one user equipment on an uplink using the at least one second node. At least one of the detecting, the receiving, and the communicating can be performed by at least one processor of at least one computing system.

In some implementations, the current subject matter can include one or more of the following optional features. The first node and the second node can be evolved node B base stations having a base band unit and a remote radio head.

In some implementations, the first node can detect the second node based on a list of available second nodes (e.g., neighbor cells, which do not need to be co-located). The list can be, but not necessarily, stored by the first node (and/or provided and/or determined by the first node and/or provided/determined by any other entity (e.g., configuration authority)).

In some implementations, at least one of the detecting and the receiving can be performed using a communication interface between a remote radio head of the first base station and the second base station using a coordinated multipoint transmission. The communication between the first node and the user equipment using the second node can reduce transmission power of the user equipment using the uplink support provided by the second node. Such communication can also reduce interference caused by the user equipment and affecting the second node.

In some implementations, the detection can be performed based on a signal received by the first node requesting the uplink support for the user equipment.

In some implementations, the first node and the user equipment can be configured to communicate on a downlink while communicating on the uplink using the second node.

In some implementations, the first node and the second node can be at least one of the following: a macro base station, a micro base station, a femto base station, a pico base station, and any combination thereof. The first node and the second node can be not co-located.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 1b illustrates further detail of the exemplary LTE system shown in FIG. 1a;

FIG. 1c illustrates additional detail of the evolved packet core of the exemplary LTE system shown in FIG. 1a;

FIG. 1d illustrates an exemplary evolved Node B of the exemplary LTE system shown in FIG. 1a;

DETAILED DESCRIPTION

To address the deficiencies of currently available solutions, one or more implementations of the current subject matter provide for an improved inter-site and/or intra-site uplink coordinated multipoint ("CoMP") transmission in a wireless communications system, such as a long term evolution network. The current subject matters' CoMP transmission techniques can be implemented in various other systems, such as, systems that can have a capable of receiving an uplink signal on one or more nodes (e.g., 3G systems, 4G LTE systems, WiMAX, 5G, etc.). As stated above, some exemplary, non-limiting implementations of the current subject matter can be implemented in a long-term evolution communications system. An exemplary long-term evolution communications system is described below.

I. Long Term Evolution Communications System

FIGS. 1a-c and 2 illustrate an exemplary conventional long-term evolution ("LTE") communication system 100 along with its various components. An LTE system or a 4G LTE, as it commercially known, is governed by a standard for wireless communication of high-speed data for mobile telephones and data terminals. The standard is based on the GSM/EDGE ("Global System for Mobile Communications"/"Enhanced Data rates for GSM Evolution") as well as UMTS/HSPA ("Universal Mobile Telecommunications System"/"High Speed Packet Access") network technologies. The standard is developed by the 3GPP ("3rd Generation Partnership Project").

Figure 1A:
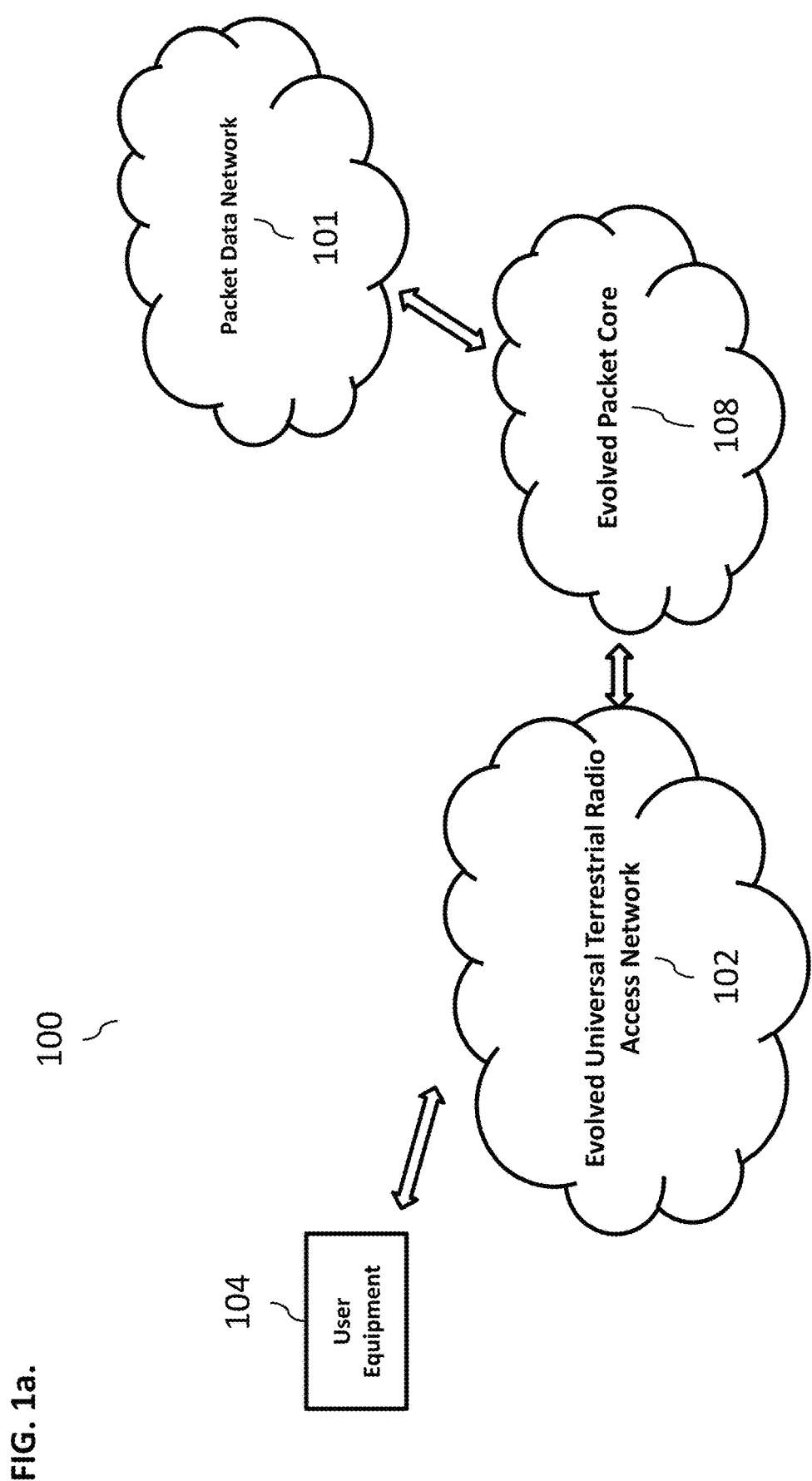
FIG. 1a illustrates an exemplary conventional long term evolution ("LTE") communications system.
Figure 1B:
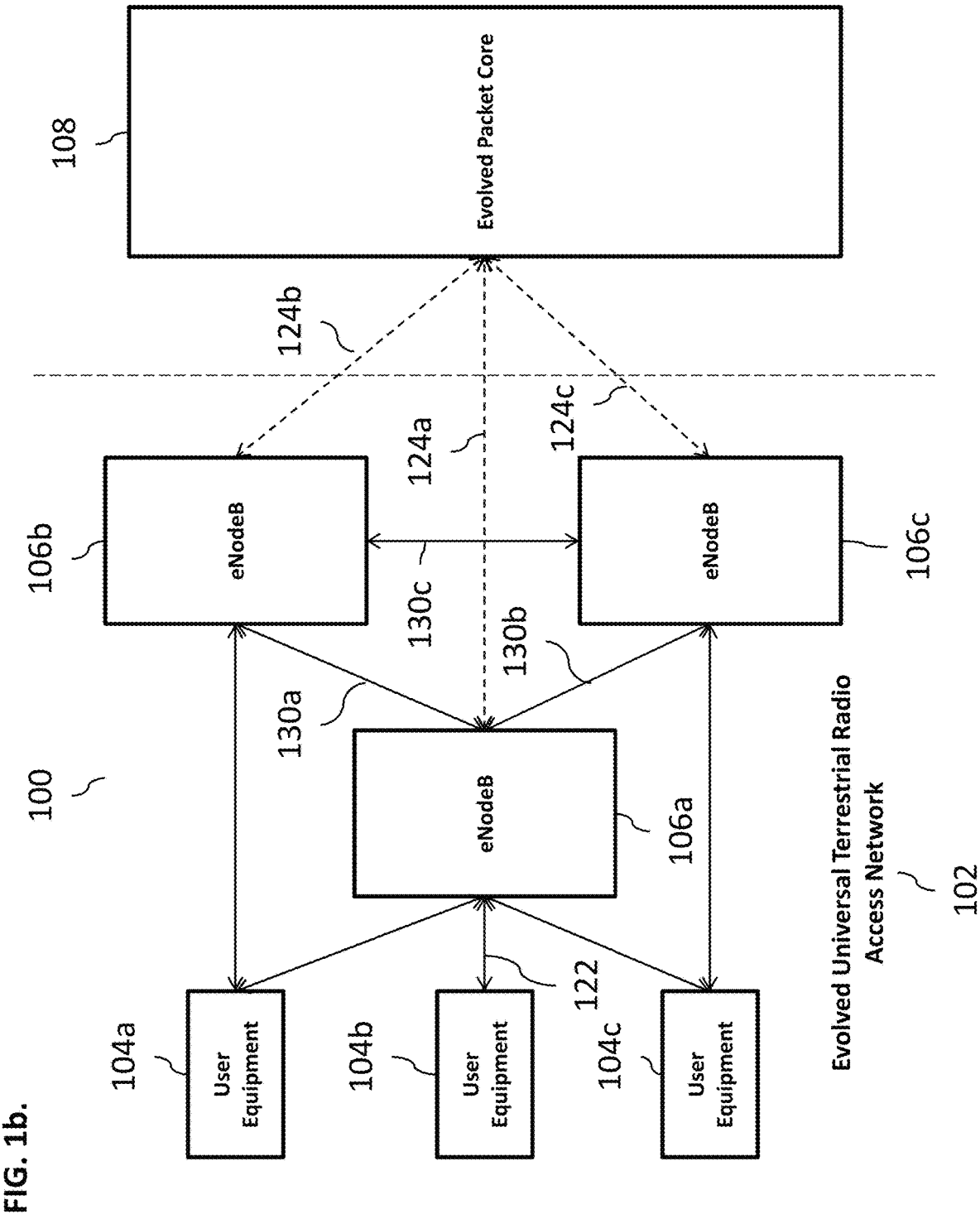

As shown in FIG. 1a, the system 100 can include an evolved universal terrestrial radio access network ("EUTRAN") 102, an evolved packet core ("EPC") 108, and a packet data network ("PDN") 101, where the EUTRAN 102 and EPC 108 provide communication between a user equipment 104 and the PDN 101. The EUTRAN 102 can include a plurality of evolved node B's ("eNodeB" or "ENODEB" or "enodeb" or "eNB") or base stations 106 (a, b, c) (as shown in FIG. 1b) that provide communication capabilities to a plurality of user equipment 104 (a, b, c). The user equipment 104 can be a mobile telephone, a smartphone, a tablet, a personal computer, a personal digital assistant ("PDA"), a server, a data terminal, and/or any other type of user equipment, and/or any combination thereof. The user equipment 104 can connect to the EPC 108 and eventually, the PDN 101, via any eNodeB 106. Typically, the user equipment 104 can connect to the nearest, in terms of distance, eNodeB 106. In the LTE system 100, the EUTRAN 102 and EPC 108 work together to provide connectivity, mobility and services for the user equipment 104.

Figure 1C:
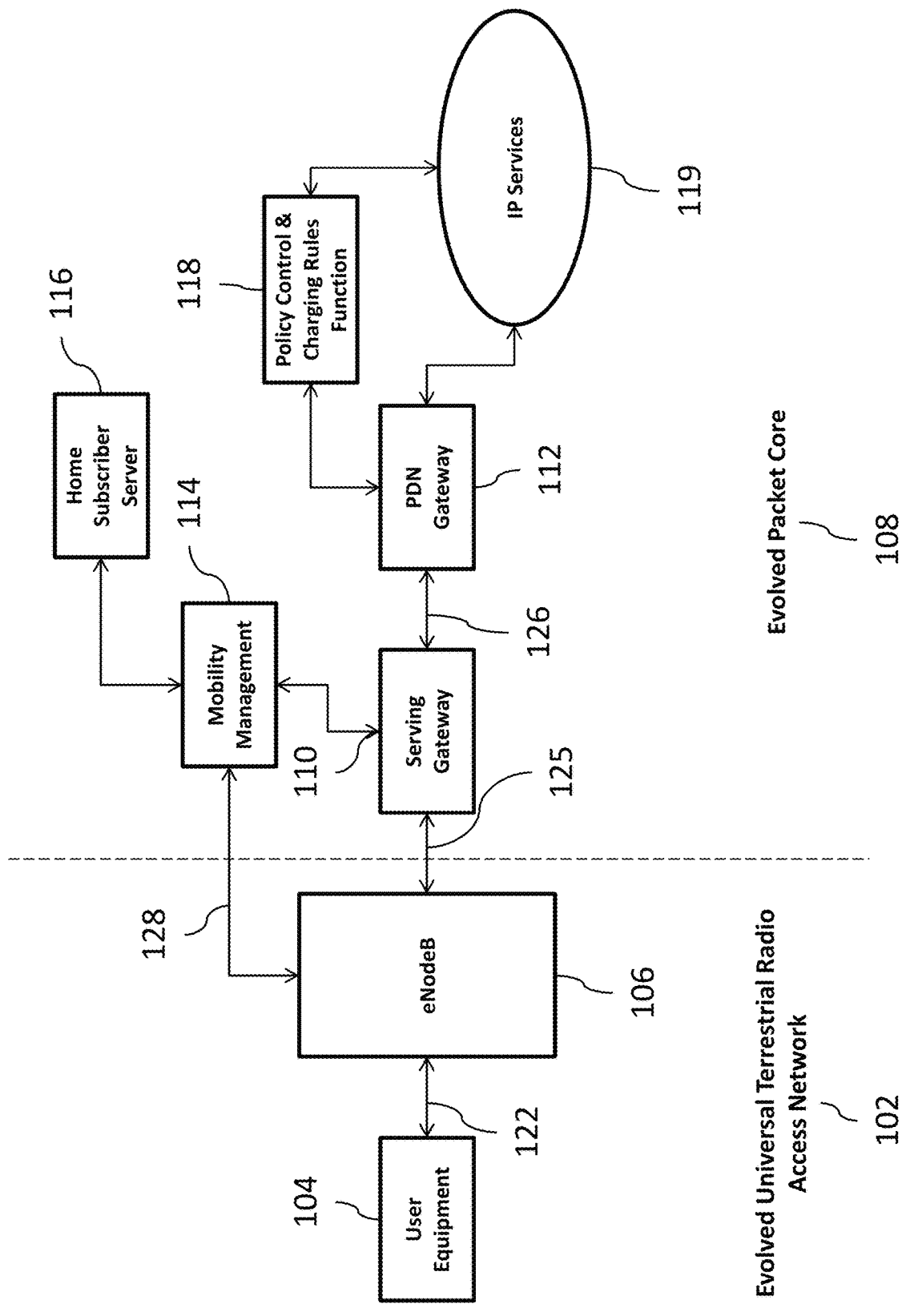

FIG. 1b illustrates further detail of the network 100 shown in FIG. 1a. As stated above, the EUTRAN 102 includes a plurality of eNodeBs 106, also known as cell sites. The eNodeBs 106 provides radio functions and performs key control functions including scheduling of air link resources or radio resource management, active mode mobility or handover, and admission control for services. The eNodeBs 106 are responsible for selecting which mobility management entities (MMES, as shown in FIG. 1c) will serve the user equipment 104 and for protocol features like header compression and encryption. The eNodeBs 106 that make up an EUTRAN 102 collaborate with one another for radio resource management and handover.

Communication between the user equipment 104 and the eNodeB 106 occurs via an air interface 122 (also known as "LTE-Uu" interface). As shown in FIG. 1b, the air interface 122 provides communication between user equipment 104b and the eNodeB 106a. The air interface 122 uses Orthogonal Frequency Division Multiple Access ("OFDMA") and Single Carrier Frequency Division Multiple Access ("SC-FDMA"), an OFDMA variant, on the downlink and uplink respectively. OFDMA allows use of multiple known antenna techniques, such as, Multiple Input Multiple Output ("MIMO").

The air interface 122 uses various protocols, which include a radio resource control ("RRC") for signaling between the user equipment 104 and eNodeB 106 and non-access stratum ("NAS") for signaling between the user equipment 104 and MME (as shown in FIG. 1c). In addition to signaling, user traffic is transferred between the user equipment 104 and eNodeB 106. Both signaling and traffic in the system 100 are carried by physical layer ("PHY") channels.

Multiple eNodeBs 106 can be interconnected with one another using an X2 interface 130(a, b, c). As shown in FIG. 1a, X2 interface 130a provides interconnection between eNodeB 106a and eNodeB 106b; X2 interface 130b provides interconnection between eNodeB 106a and eNodeB 106c; and X2 interface 130c provides interconnection between eNodeB 106b and eNodeB 106c. The X2 interface can be established between two eNodeBs in order to provide an exchange of signals, which can include a load- or interference-related information as well as handover-related information. The eNodeBs 106 communicate with the evolved packet core 108 via an S1 interface 124(a, b, c). The S1 interface 124 can be split into two interfaces: one for the control plane (shown as control plane interface (S1-MME interface) 128 in FIG. 1c) and the other for the user plane (shown as user plane interface (S1-U interface) 125 in FIG. 1c).

The EPC 108 establishes and enforces Quality of Service ("QoS") for user services and allows user equipment 104 to maintain a consistent internet protocol ("IP") address while moving. It should be noted that each node in the network 100 has its own IP address. The EPC 108 is designed to interwork with legacy wireless networks. The EPC 108 is also designed to separate control plane (i.e., signaling) and user plane (i.e., traffic) in the core network architecture, which allows more flexibility in implementation, and independent scalability of the control and user data functions.

The EPC 108 architecture is dedicated to packet data and is shown in more detail in FIG. 1c. The EPC 108 includes a serving gateway (S-GW) 110, a PDN gateway (P-GW) 112, a mobility management entity ("MME") 114, a home subscriber server ("HSS") 116 (a subscriber database for the EPC 108), and a policy control and charging rules function ("PCRF") 118. Some of these (such as S-GW, P-GW, MME, and HSS) are often combined into nodes according to the manufacturer's implementation.

The S-GW 110 functions as an IP packet data router and is the user equipment's bearer path anchor in the EPC 108. Thus, as the user equipment moves from one eNodeB 106 to another during mobility operations, the S-GW 110 remains the same and the bearer path towards the EUTRAN 102 is switched to talk to the new eNodeB 106 serving the user equipment 104. If the user equipment 104 moves to the domain of another S-GW 110, the MME 114 will transfer all of the user equipment's bearer paths to the new S-GW. The S-GW 110 establishes bearer paths for the user equipment to one or more P-GWs 112. If downstream data are received for an idle user equipment, the S-GW 110 buffers the downstream packets and requests the MME 114 to locate and reestablish the bearer paths to and through the EUTRAN 102.

The P-GW 112 is the gateway between the EPC 108 (and the user equipment 104 and the EUTRAN 102) and PDN 101 (shown in FIG. 1a). The P-GW 112 functions as a router for user traffic as well as performs functions on behalf of the user equipment. These include IP address allocation for the user equipment, packet filtering of downstream user traffic to ensure it is placed on the appropriate bearer path, enforcement of downstream QoS, including data rate. Depending upon the services a subscriber is using, there may be multiple user data bearer paths between the user equipment 104 and P-GW 112. The subscriber can use services on PDNs served by different P-GWs, in which case the user equipment has at least one bearer path established to each P-GW 112. During handover of the user equipment from one eNodeB to another, if the S-GW 110 is also changing, the bearer path from the P-GW 112 is switched to the new S-GW.

The MME 114 manages user equipment 104 within the EPC 108, including managing subscriber authentication, maintaining a context for authenticated user equipment 104, establishing data bearer paths in the network for user traffic, and keeping track of the location of idle mobiles that have not detached from the network. For idle user equipment 104 that needs to be reconnected to the access network to receive downstream data, the MME 114 initiates paging to locate the user equipment and re-establishes the bearer paths to and through the EUTRAN 102. MME 114 for a particular user equipment 104 is selected by the eNodeB 106 from which the user equipment 104 initiates system access. The MME is typically part of a collection of MMEs in the EPC 108 for the purposes of load sharing and redundancy. In the establishment of the user's data bearer paths, the MME 114 is responsible for selecting the P-GW 112 and the S-GW 110, which will make up the ends of the data path through the EPC 108.

The PCRF 118 is responsible for policy control decision-making, as well as for controlling the flow-based charging functionalities in the policy control enforcement function ("PCEF"), which resides in the P-GW 110. The PCRF 118 provides the QoS authorization (QoS class identifier ("QCI") and bit rates) that decides how a certain data flow will be treated in the PCEF and ensures that this is in accordance with the user's subscription profile.

As stated above, the IP services 119 are provided by the PDN 101 (as shown in FIG. 1a).

II. eNodeB

Figure 1D:
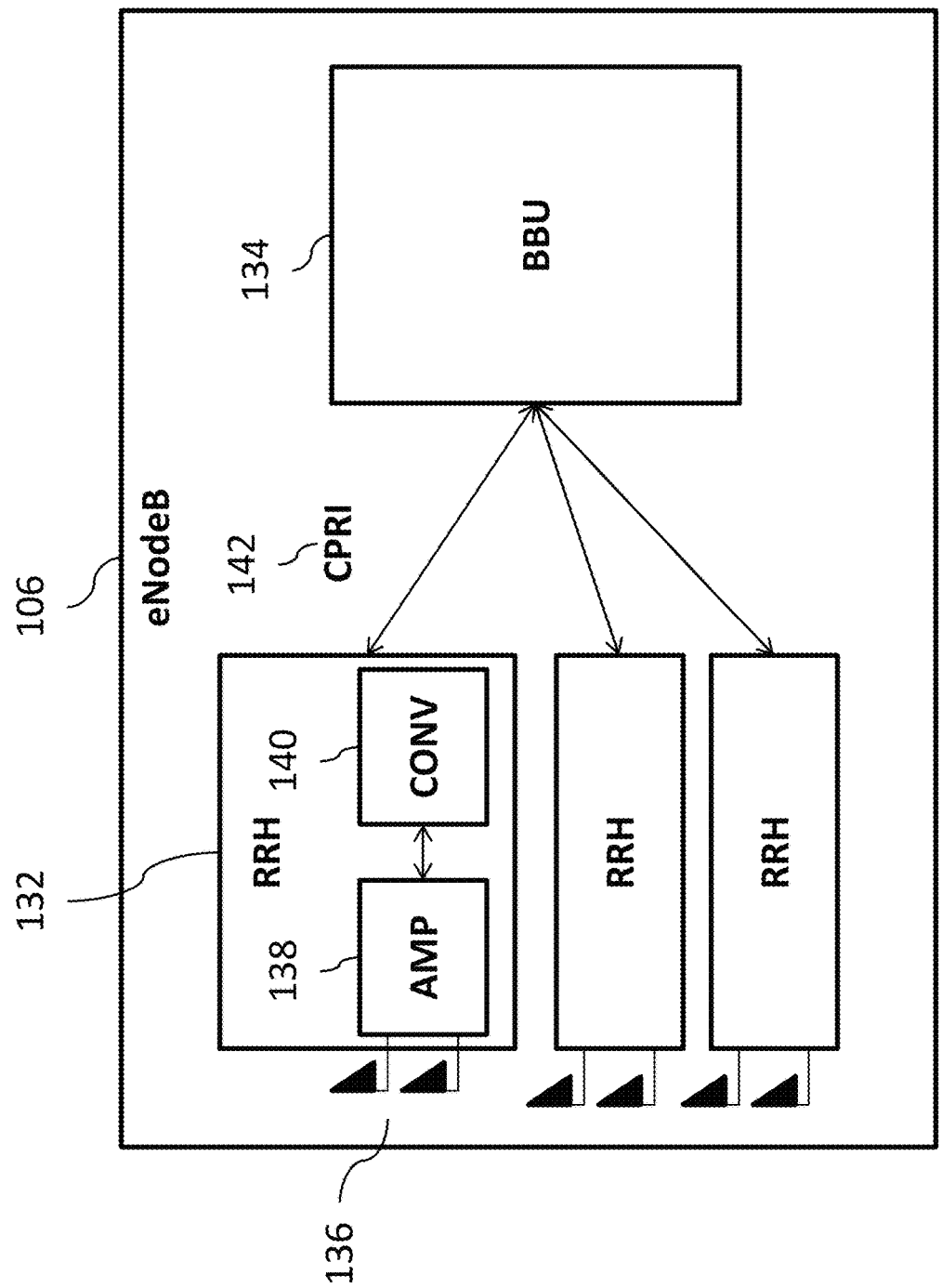

FIG. 1d illustrates an exemplary structure of eNodeB 106. The eNodeB 106 can include at least one remote radio head ("RRH") 132 (typically, there can be three RRH 132) and a baseband unit ("BBU") 134. The RRH 132 can be connected to antennas 136. The RRH 132 and the BBU 134 can be connected using an optical interface that is compliant with common public radio interface ("CPRI") 142 standard specification. The operation of the eNodeB 106 can be characterized using the following standard parameters (and specifications): radio frequency band (Band4, Band9, Band17), bandwidth (5, 10, 15, 20 MHz), access scheme (downlink: OFDMA; uplink: SC-OFDMA), antenna technology (downlink: 2×2 MIMO; uplink: 1×2 single input multiple output ("SIMO")), number of sectors (6 maximum), maximum transmission power (60 W), maximum transmission rate (downlink: 150 Mb/s; uplink: 50 Mb/s), S1/X2 interface (1000Base-SX, 1000Base-T), and mobile environment (up to 350 km/h). The BBU 134 can be responsible for digital baseband signal processing, termination of S1 line, termination of X2 line, call processing and monitoring control processing. IP packets that are received from the EPC 108 (not shown in FIG. 1d) can be modulated into digital baseband signals and transmitted to the RRH 132. Conversely, the digital baseband signals received from the RRH 132 can be demodulated into IP packets for transmission to EPC 108.

The RRH 132 can transmit and receive wireless signals using antennas 136. The RRH 132 can convert (using converter ("CONV") 140) digital baseband signals from the BBU 134 into radio frequency ("RF") signals and power amplify (using amplifier ("AMP") 138) them for transmission to user equipment 104 (not shown in FIG. 1d). Conversely, the RF signals that are received from user equipment 104 are amplified (using AMP 138) and converted (using CONV 140) to digital baseband signals for transmission to the BBU 134.

Figure 2:
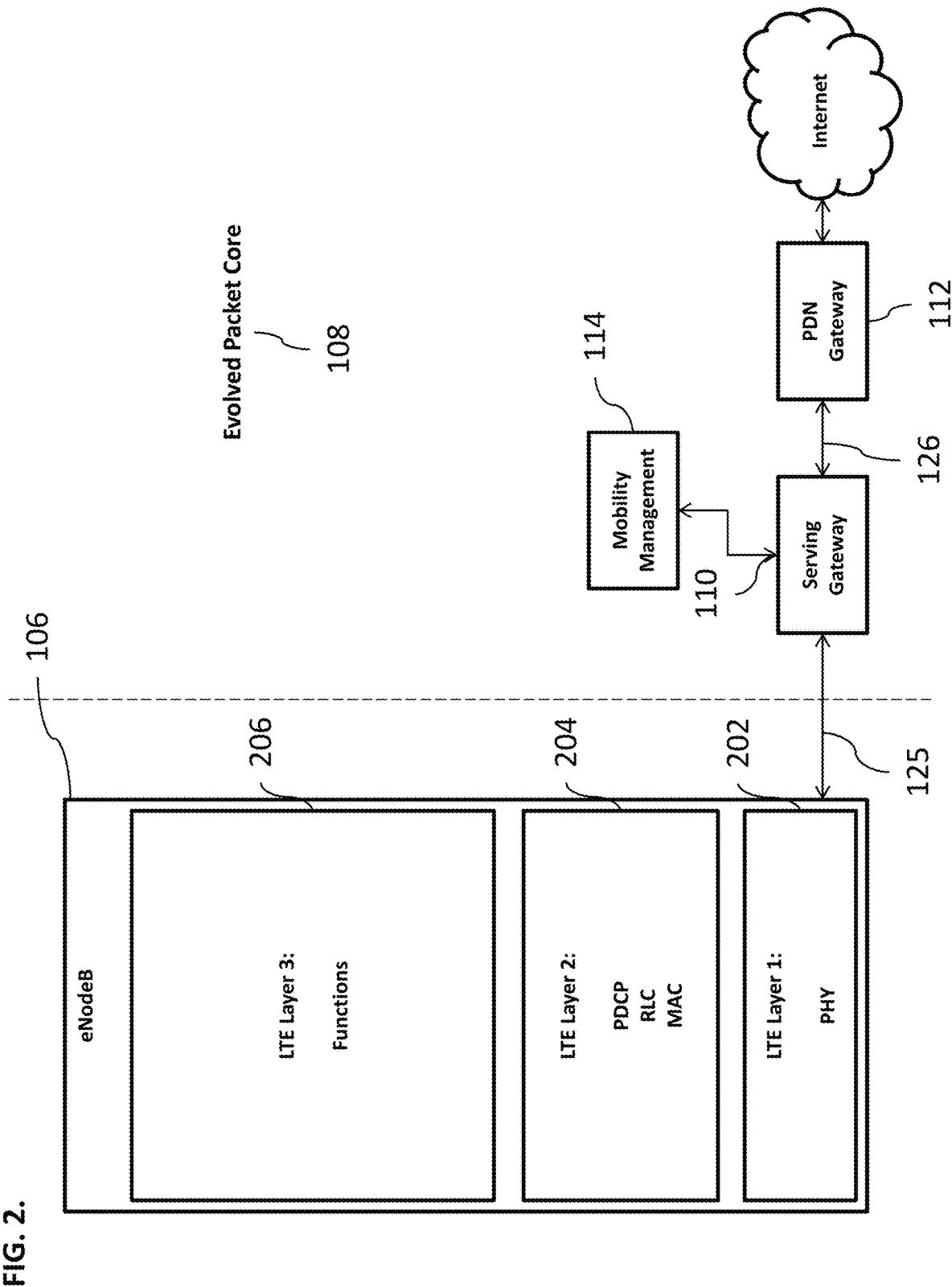
FIG. 2 illustrates further detail of an evolved Node B shown in FIGS. 1a-d.

FIG. 2 illustrates an additional detail of an exemplary eNodeB 106. The eNodeB 106 includes a plurality of layers: LTE layer 1 202, LTE layer 2 204, and LTE layer 3 206. The LTE layer 1 includes a physical layer ("PHY"). The LTE layer 2 includes a medium access control ("MAC"), a radio link control ("RLC"), a packet data convergence protocol ("PDCP"). The LTE layer 3 includes various functions and protocols, including a radio resource control ("RRC"), a dynamic resource allocation, eNodeB measurement configuration and provision, a radio admission control, a connection mobility control, and radio resource management ("RRM"). The RLC protocol is an automatic repeat request ("ARQ") fragmentation protocol used over a cellular air interface. The RRC protocol handles control plane signaling of LTE layer 3 between the user equipment and the EUTRAN. RRC includes functions for connection establishment and release, broadcast of system information, radio bearer establishment/reconfiguration and release, RRC connection mobility procedures, paging notification and release, and outer loop power control. The PDCP performs IP header compression and decompression, transfer of user data and maintenance of sequence numbers for Radio Bearers. The BBU 134, shown in FIG. 1d, can include LTE layers L1-L3.

One of the primary functions of the eNodeB 106 is radio resource management, which includes scheduling of both uplink and downlink air interface resources for user equipment 104, control of bearer resources, and admission control. The eNodeB 106, as an agent for the EPC 108, is responsible for the transfer of paging messages that are used to locate mobiles when they are idle. The eNodeB 106 also communicates common control channel information over the air, header compression, encryption and decryption of the user data sent over the air, and establishing handover reporting and triggering criteria. As stated above, the eNodeB 106 can collaborate with other eNodeB 106 over the X2 interface for the purposes of handover and interference management. The eNodeBs 106 communicate with the EPC's MME via the S1-MME interface and to the S-GW with the S1-U interface. Further, the eNodeB 106 exchanges user data with the S-GW over the S1-U interface. The eNodeB 106 and the EPC 108 have a many-to-many relationship to support load sharing and redundancy among MMES and S-GWs. The eNodeB 106 selects an MME from a group of MMES so the load can be shared by multiple MMES to avoid congestion.

III. Intelligent LTE Radio Access Network

Figure 3:
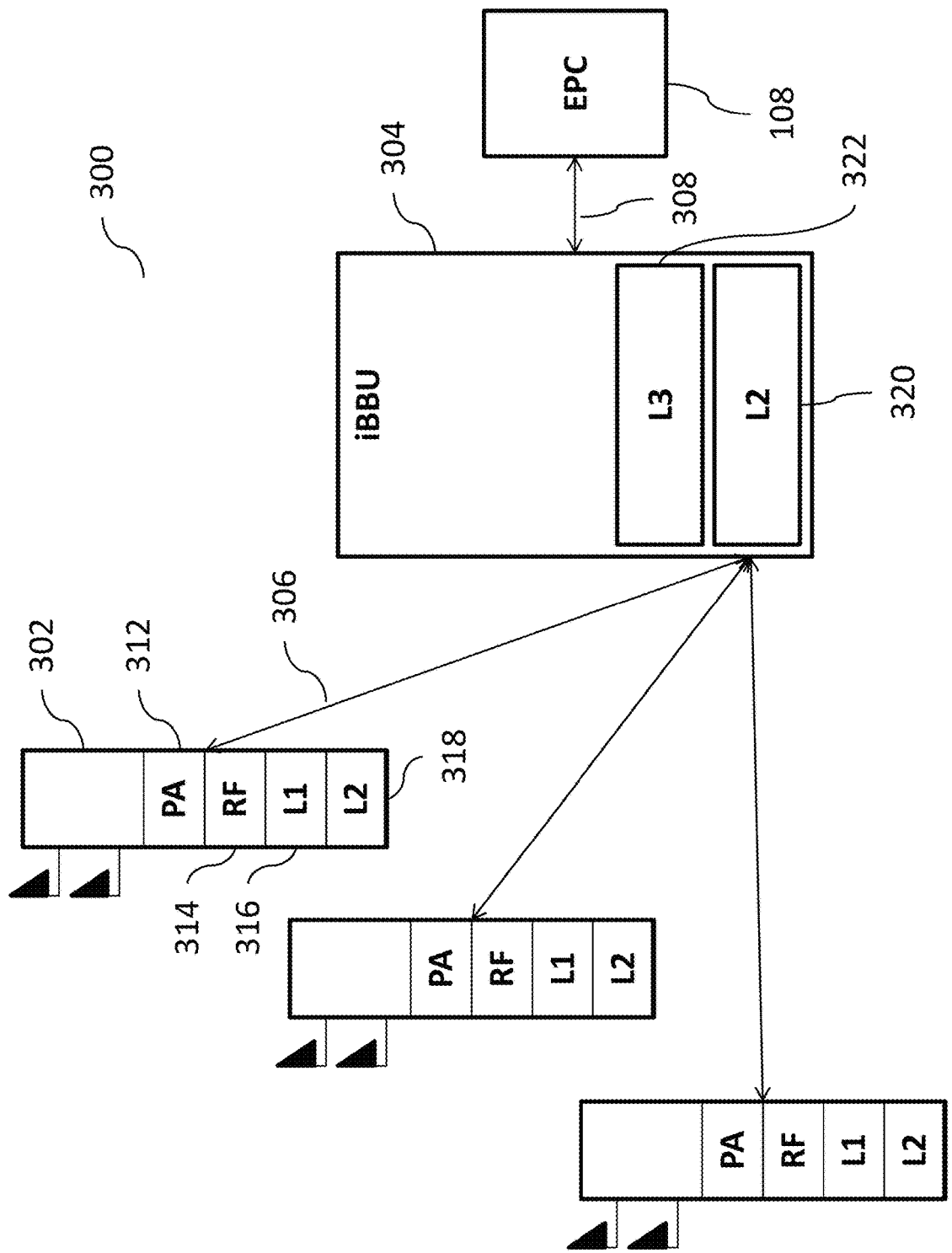
FIG. 3 illustrates an exemplary intelligent Long Term Evolution Radio Access Network, according to some implementations of the current subject matter.

FIG. 3 illustrates an exemplary system 300, according to some implementations of the current subject matter. The system 300 can be implemented as a centralized cloud radio access network ("C-RAN") or a virtual radio access network ("V-RAN"). The system 300 can include at least one intelligent remote radio head ("iRRH") unit 302 and an intelligent baseband unit ("iBBU") 304. The iRRH 302 and iBBU 304 can be connected using Ethernet fronthaul ("FH") communication 306 and the iBBU 304 can be connected to the EPC 108 using backhaul ("BH") communication 308. The user equipment 104 (not shown in FIG. 3) can communicate with the iRRH 302.

In some implementations, the iRRH 302 can include the power amplifier ("PA") module 312, the radio frequency ("RF") module 314, LTE layer L1 (or PHY layer) 316, and a portion 318 of the LTE layer L2. The portion 318 of the LTE layer L2 can include the MAC layer and can further include some functionalities/protocols associated with RLC and PDCP, as will be discussed below. The iBBU 304 can be a centralized unit that can communicate with a plurality of iRRH and can include LTE layer L3 322 (e.g., RRC, RRM, etc.) and can also include a portion 320 of the LTE layer L2. Similar to portion 318, the portion 320 can include various functionalities/protocols associated with PDCP. Thus, the system 300 can be configured to split functionalities/protocols associated with PDCP between iRRH 302 and the iBBU 304.

In some implementation, the system 300 can implement carrier aggregation ("CA") and coordinated multipoint ("CoMP") transmission features. The CA and CoMP features have been discussed in the 3GPP standards for 4G LTE-Advanced, Releases 10 and 11, respectively. Both features are designed to increase data throughput rate and designed to work with 4G LTE-Advanced. The following is a brief summary of each of these features.

A. Carrier Aggregation

The CA or channel aggregation enables multiple LTE carriers to be used together to provide high data rates that are required for 4G LTE-Advanced. These channels or carriers can be in contiguous elements of the spectrum, or they may be in different bands. The carriers can be aggregated using contiguous intra-band carrier aggregation, non-contiguous intra-band carrier aggregation, and inter-band non-contiguous carrier aggregation. In the contiguous intra-band carrier aggregation, carriers are adjacent to one another and aggregated channel can be considered by a user equipment as a single enlarged channel from a radio frequency ("RF") viewpoint and only one transceiver is required within the user equipment (usually, more transceivers are required where the channels are not adjacent). In the non-contiguous intra-band carrier aggregation typically requires two transceivers and a multi-carrier signal is not treated as a single signal. In the inter-band non-contiguous carrier aggregation, multiple transceivers are required to be present within a single user equipment, which can affect cost, performance and power. Additionally, this aggregation technique can require reduction in intermodulation and cross modulation from the two transceivers. When carriers are aggregated, each carrier can be referred to as a component carrier. There exist two categories of component carriers: a primary component carrier (i.e., main carrier in any group; there are a primary downlink carrier and an associated uplink primary component carrier), and a secondary component carrier (there are one or more secondary component carriers). Association between downlink primary and corresponding uplink primary component carriers is cell specific.

When LTE carrier aggregation is used, it is necessary to be able to schedule the data across the carriers and to inform the terminal of the DCI rates for different component carriers. Cross-carrier scheduling can be achieved individually via RRC signaling on a per component carrier basis or a per user equipment basis. When no cross-carrier scheduling is arranged, the downlink scheduling assignments can be achieved on a per carrier basis. For the uplink, an association can be created between one downlink component carrier and an uplink component carrier. When cross-carrier scheduling is active, the physical downlink shared channel ("PDSCH") on the downlink or the physical uplink shared channel ("PUSCH") on the uplink is transmitted on an associate component carrier other than the physical downlink control channel ("PDCCH"), the carrier indicator in the PDCCH provides the information about the component carrier used for the PDSCH or PUSCH. The PDSCH is the main data bearing channel allocated to users on a dynamic basis and that carries data in transport blocks ("TB") that correspond to a MAC packet data unit ("PDU"), which are passed from the MAC layer to the PHY layer once per transmission time interval ("TTI") (i.e., 1 ms). The PUSCH is a channel that carries user data and any control information necessary to decode information such as transport format indicators and MIMO parameters. The PDCCH is a channel that carries resource assignment for user equipments, which are contained in a downlink control information ("DCI") message.

There exist five deployment scenarios for CA. In the first scenario, cells (e.g., F1 and F2 cells) can be co-located and overlaid, thereby providing nearly the same coverage. Both layers provide sufficient coverage and mobility can be supported on both layers. In the second scenario, cells F1 and F2 can be co-located and overlaid, however, F2 cells have smaller coverage due to larger path losses, where only F1 cells provide sufficient coverage and F2 cells are used to improve throughput. Here, mobility is performed based on F1 cells coverage. In the third scenario, F1 and F2 cells are co-located and overlaid, however, F2 cells have smaller coverage due to larger path losses, where only F1 cells provide sufficient coverage and F2 cells are used to improve throughput. Here, mobility is based on F1 cells coverage. In the fourth scenario, F1 cells provide macro coverage and F2 cells' remote radio heads are used to improve throughput at hot spots, where mobility is again performed based on F1 cells coverage. In the fifth scenario, which is similar to the second scenario, frequency selective repeaters are deployed so that coverage is extended for one of the carrier frequencies. It is expected that F1 and F2 cells of the same eNodeB can be aggregated where coverage overlaps.

B. Coordinated Multipoint Transmission

As stated above, the CoMP transmission feature is used to send and receive data to and from a user equipment from several points to ensure that the improved performance is achieved even at cell edges. CoMP enables dynamic coordination of transmission and reception over a variety of different base stations to improve overall quality for the user as well as improve utilization of the network. CoMP further requires close coordination between several geographically separated eNodeBs to provide joint scheduling and transmissions, joint processing of received signals, thereby allowing a user equipment at the edge of a cell to be served by two or more eNodeBs so as to improve signal reception/transmission and increase throughput.

There exist four deployment scenarios for CoMP. The first scenario involves a homogeneous network with intra-site CoMP. The second scenario also involves a homogeneous network but with high transmission power RRHs. The third scenario involves a heterogeneous network with low power RRHs within a macro cell coverage, where transmission/reception points created by the RRHs have different cell identifiers as the macro cell. The fourth scenario involves a heterogeneous network with low power RRHs within a macro cell coverage, where transmission/reception points created by the RRHs have the same cell identifiers as the macro cell.

Joint reception and processing as well as coordinated scheduling can be implemented in the uplink CoMP. Joint reception and processing format uses antennas at different sites and by coordinating between different base stations, a virtual antenna array can be formed. Signals received by the base stations are combined and processed to produce the final output signal. The joint reception and processing format results in reduction of errors even when low strength signals or signals masked by interference are received. Coordinated scheduling format coordinates scheduling decisions among multiple base stations to reduce or minimize interference. This format allows for a reduced load in the backhaul as only the scheduling data is transferred between different coordinating base stations.

C. Ethernet-Based Front Haul In Intelligent LTE RAN

Figure 4:
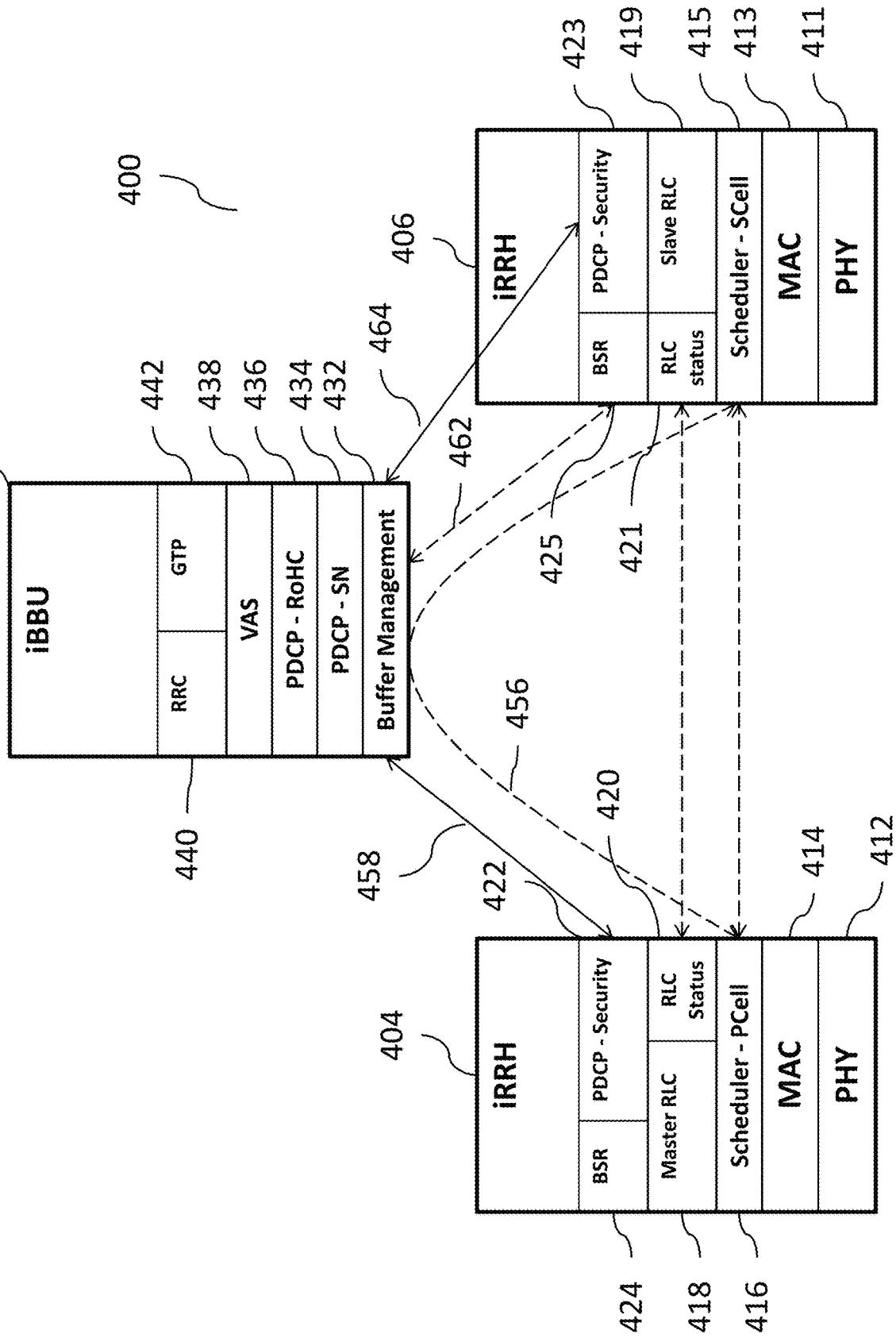
FIG. 4 illustrates an exemplary intelligent Long Term Evolution Radio Access Network implementing carrier aggregation feature, according to some implementations of the current subject matter.

FIG. 4 illustrates an exemplary system 400, according to some implementations of the current subject matter. An exemplary system 400 is disclosed in co-owned, co-pending U.S. patent application Ser. No. 14/179,421, filed Feb. 12, 2014, and entitled "Long Term Evolution Radio Access Network," the disclosure of which is incorporated herein by reference in its entirety. The system 400 can be configured to implement 4G LTE-Advanced features, including carrier aggregation feature. The system 400 can include an intelligent baseband unit ("iBBU") 402, a primary cell ("Pcell") intelligent remote radio head 404 and one or more secondary cells ("Scell") intelligent remote radio heads 406. In LTE CA, the Pcell is the serving cell where the UE has an RRC connection with the radio access network. Pcell can only be changed through a successful execution of a handover procedure. Scell is a secondary cell that can be added/ removed from the configured cells list when the UE moves into/out of its coverage area. The configuration of a Scell is done by RRC based on mobility measurement events triggered in the UE and sent to RRC.

As shown in FIG. 4, each iRRH 404 and 406 can both include the LTE layer 1 (i.e., the PHY layer) and have LTE layer 2 (i.e., MAC, PDCP, RLC) split among themselves as well as iBBU 402. The iRRH 404 can include a PHY layer 412, a MAC layer 414, a scheduler-Pcell component 416, a master RLC component 418, a RLC status component 420, a PDCP-security component 422, and a BSR component 424. Similarly, the iRRH 406 can include a PHY layer 411, a MAC layer 413, a scheduler-Scell component 415, a slave RLC component 419, a RLC status component 421, a PDCP-security component 423, and a BSR component 425. The iBBU 402 can include a buffer management component 432, a PDCP-SN component 434, a PDCP-RoHC component 436, a VAS component 438, an RRC component 440, and a GTP component 442.

The buffer management component 432 can implement use of buffer occupancy reports that can be received from the iRRH's to control flow of user data to the Pcell and/or Scell in order to enable in sequence delivery of the data to the user equipment. The PDCP-SN component 434 can perform sequence numbering of the PDCP service data units ("PDCP SDUs"). The PDCP robust header compression ("PDCP-RoHC") component 436 can perform IP header compression for voice-over-LTE service flows. The value added services ("VAS") component 438 can provide application intelligence in the eNodeB by performing shallow packet inspection and deep packet inspection of data flows. This component can also determine how a particular data flow can be treated. A shallow packet inspection ("SPI") can be performed by inspecting one or more headers of the data packet to determine information associated with the data packet. For example, the shallow packet inspection can inspect an IP header of the data packet in order to determine the source IP address of the data packet. In some implementations, based on the results of the shallow packet inspection, a deep packet inspection ("DPP") can be performed by examining other layers of the data packet. In some implementations, the payload of a data packet can be inspected to determine what resource blocks should be assigned to the data packet.

The iRRH 404 and the iRRH 406 can communicate with one another via an inter-iRRH interface, which can be a direct connection 452, or a connection that can be shared with a fronthaul connection 458. The iRRH 404 can communicate with the iBBU 402 using the fronthaul ("FH") connection 458 and the iRRH 406 can communicate with the iBBU 402 using FH connection 464.

In some implementations, the iBBU 402 can provide a centralized remote radio resource control ("RRC") using RRC component 440, thereby eliminating a need for a long-delay inter-RRC coordination and providing an ability to configure LTE layer 2 in iRRH 404 and 406. This capability can be implemented as part of the coordinated multipoint transmission feature, as discussed below.

As shown in FIG. 4, the functionalities associated PDCP protocol can be split among the iBBU 402, the iRRH 404, and the iRRH 406. The PDCP-ROHC 436 (where ROHC refers to robust header compression protocol that is used to compress packets) and the PDCP-SN 434 (where SN refers to sequence numbering) together with buffer management component 432 in iBBU 402 can be referred to as PDPC-upper, and PDCP-security 422, 423 in iRRH 404, 406, respectively, can be referred to as PDCP-lower. By having PDCP-upper in the iBBU 402 and PDCP-lower in iRRH 404, 406, the PDCP functionalities can be centralized to handle the ROHC and sequence numbering functions by the iBBU 402, and ciphering functions by the iRRH (which refer to known functionalities of the PDPC). In some implementations, the PDCP-upper in iBBU 402 can also handle coordination of data flows to the schedulers in the iRRHs.

Further, by using PDCP-upper and PDCP-lower, flow control between iBBU 402 and iRRH 406 can be provided. The flow control can depend on an estimated data rate for the bearer. For example, on the downlink 462, the PDCP-upper can send compressed and numbered packets to Pcell iRRH 404 and Scell iRRH 406 in proportion based on buffer occupancy level and estimated data rate from the reports provided by PDCP-lower. In some implementations, the PDCP-lower can generate a report of a buffer occupancy level. This report can be generated periodically, upon request, automatically, manually, and/or on for any period of time. Based on the report, the PDCP-upper can estimate a buffer draining rate based on consecutive buffer occupancy reports (e.g., two reports), a time that elapsed between the reports and the additional data that was sent to the buffer between the reports.

The iBBU 402 can include a buffer management function 432 to support the in-sequenced delivery of PDCP packet data units ("PDCP PDU") and support value added services ("VAS") multi-queue implementation for the default bearer. The buffer management function 432 can detect buffer stalling in the Scell 406 and trigger a redirection of the staled PDCP PDU packets to the Pcell 404. PDCP-lower can detect outdated packets and discard them from its buffer. The in-sequenced delivery of PDCP PDUs can refer to a requirement for data flow transmitted in RLC acknowledged and unacknowledged modes. VAS multi-queue implementation can enable prioritization of data flows within the default bearer. In some implementations, the detection of buffer stalling can be based on an estimated buffer drain rate that can be derived from the buffer occupancy reports received from the PDCP-lower.

In some implementations, to perform redirection of packets, the PDCP-upper can tag each packet data unit with time-to-live information (which can refer to an amount of time before a data packet expires). Then, the PDCP-lower can remove the packet from its buffer when the time-to-live timer for that packet expires and inform the PDCP-upper of the deleted packet's number. The PDCP-upper can decide whether to resend the deleted packet to the same PDCP-lower and/or redirect the deleted packet to a PDCP-lower of another iRRH. The discarding of packets can be performed on the Pcell and/or the Scell and the packets can be redirected toward the Pcell and/or the Scell.

In some implementations, the RLC protocol handling can be split between iRRH 404 and iRRH 406, where the iRRH 404 can include a master RLC component 418 and the iRRH 406 can include a slave RLC component 419. The master RLC component 418 can allocate an RLC PDU sequence number to the slave RLC component 419, thereby centralizing RLC PDU sequence numbering process. In the current subject matter system, each RLC entity can maintain a list of unacknowledged PDUs that it has transmitted and thus, handle the ARQ procedures for only those unacknowledged PDUs that it has transmitted. This is because the RLC entity might not be aware of other PDUs that can be sent by other entities and/or might not have the original data to handle the re-transmissions of the unacknowledged PDUs. In some implementations, an RLC ARQ status PDU, which can be sent from a user equipment at a rate of once very few 10's of a millisecond, can be shared between the two RLC entities over the inter-iRRH interface, i.e., the direct connection 452 and/or a connection shared with fronthaul 458. In some implementations, the physical connection for this inter-iRRH interface can either be direct and/or through a L2 Ethernet switch. In some implementations, the above inter-iRRH interface can leverage industry standard stream control transport protocol ("SCTP") over IP. The application layer information exchange can be based on an inter-process communication protocols.

In some implementations, the inter-iRRH interface 452 can provide a low latency interface for sharing of the RLC status information PDUs as well as any other information between iRRHs 404 and 406. Channel state information ("CSI"), acknowledgement/non-acknowledgement ("ACK/NACK") signaling, precoding matrix indicator ("PMI"), and rank indicator ("RI") that are received by the Pcell iRRH 404 can be forwarded over the inter-iRRH interface 452 for sharing with an Scell scheduler 415 via the fronthaul or direct gigabit Ethernet ("GE") connection. This information can be available to the Scell scheduler on the same subframe that it was sent in order not to incur any impact the H-ARQ RTT, which can be targeted to be 8 ms. The Scell scheduler can also accommodate longer delay in obtaining the H-ARQ feedback and can impact H-ARQ round trip time on the Scell.

In some implementations, the inter-iRRH interface 452 can be used by the Scell iRRH 406 to inform the Pcell iRRH 404 which PUCCH resource to expect the arrival of the H-ARQ ACK/NACK feedback for a packet sent on the Scell (where the allocation of PUCCH resources is defined in the 3GPP Standards for 4G LTE). By way of a non-limiting example, the scheduler can be designed to determine which user equipment to schedule 2 ms in advance of when the data is transmitted over the air. The H-ARQ ACK/NACK can be sent from the user equipment 4 ms after the data has been received. Thus, to ensure the Pcell iRRH 404 is informed of the PUCCH resource usage before the downlink H-ARQ ACK/NACK information arrives from the user equipment, an exemplary one-way latency for the inter-iRRH interface 452 might not be more than 4 ms. As can be understood, the above is provided as an illustrative non-limiting, exemplary implementation of the current subject matter system. It should be further understood that the current subject matter system is not limited to specific data scheduling parameters and/or particular latency associated with transmission of data, and can be designed using any scheduling, latency and/or any other parameters.

In some implementations, the inter-iRRH transport 456 can be shared with the fronthaul and switched at the iBBU 402 and/or a physical direct connection 452 between the iRRHs 404, 406 using a gigabit Ethernet interface. When the inter-iRRH interface is configured as a switched connection 456 across the fronthaul, the fronthaul latency can be based on a very low latency transport such as in the case when the iBBU 402 and the iRRHs 404 and/or 406 are collocated and/or when based on LOS wireless transport such as MW, mmWave, FSO, when the iRRH's are geographically separated.

IV. Uplink Coordinated Multi-Point Transmission

Figure 5A:
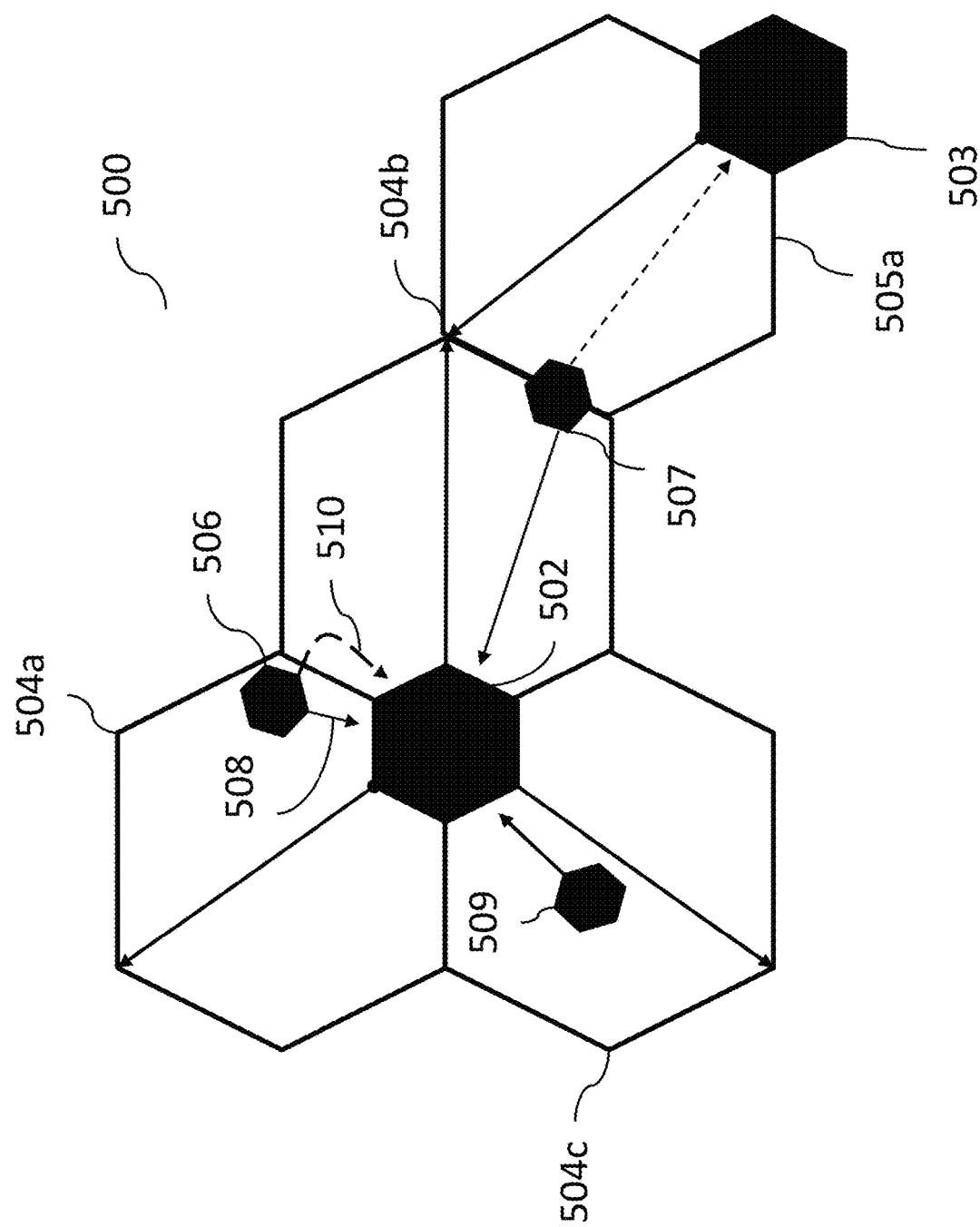
FIGS. 5a-b illustrate exemplary power control systems, according to some implementations of the current subject matter.

FIG. 5a illustrates an exemplary system 500 for controlling power consumption of a user equipment, according to some implementations of the current subject matter. The system 500 can include a cell 502 (e.g., an eNode, as for example shown in FIGS. 1a-4 and discussed above) disposed in a C-RAN and/or V-RAN systems. In some exemplary, non-limiting implementations, the cell 502 can be a macro cell that can provide wireless communication to a predetermined geographical area, such as sectors 504 (a, b, c, d). Other types of cells (e.g., micro, femto, pico, etc.) can be used as well. The sectors 504 can be adjacent to one another. A user equipment 506 can be located in one of the sectors 504 (e.g., sector 504a) and can communicate with the macro cell 502. As can be understood, one or more user equipments can be serviced by the macro cell 502. The user equipment 506 can be located anywhere within a particular sector 504 and/or can move between sectors 504. In some implementations, the user equipment can be located away from the edge of the sector (e.g., user equipment 509 in sector 504c). In some exemplary implementations, a user equipment can be located near the edge of a sector (e.g., user equipment 506 in sector 504a).

When the user equipment is located away from the edge of the sector, i.e., user equipment 509, the user equipment will communicate with the macro cell 502 on the uplink connection within the sector that it is located in, i.e., sector 504c. Other sectors 504 might not be used by the user equipment 509 for this communication for such communications.

When the user equipment is located near the edge of the sector, i.e., user equipment 506 located near the edge of the sector 504a as well as the edge of the sector 504b. In this scenario, the user equipment 506 can utilize remote radio heads of the sectors 504a and 504b. The user equipment 506 can use uplink communication 508 to communicate with the macro cell 502 within sector 504a using the remote radio head servicing that sector. However, in view of the proximity of the edge between sectors 504a and 504b, the user equipment 506 can utilize remote radio head servicing sector 504b (such as by using sidehaul communication where the remote radio heads serving the sectors 504 can communicate with one another to combine information from the servicing sectors 504a and 504b). The decision can be made based on at least one of the following: a measured signal quality on the uplink and/or downlink connections between the macro cell 502 and the user equipment 506, ability of the neighbor sector to support communication with the user equipment 506 and/or with each other, and/or any other factors. This can allow use of the coordinated multipoint transmission techniques to select an optimal uplink path between the user equipment and the cell site. This allows for conservation of power resources of the user equipment and improved throughput.

In some implementations, the user (e.g., user 507) can be located on an edge separating two sectors, e.g., sector 504b and sector 505a. The sectors 504b can be served by the macro cell 502 and the sector 505a can be served by a macro cell 503. As such, the two sectors 504b and 505a can be physically separate. The user equipment 507 can transmit signal in an omni-directional manner, where its transmissions can be received by the cell cite 502 and cell site 503, thereby allowing inter-site coordination between two cell sites. Again, the decision which site to use can be made based on at least one of the following: a measured signal quality on the uplink and/or downlink connections between the cells 502, 503 and the user equipment 507, ability of the sectors 504b, 505a to support communication with the user equipment 507 and/or each other, and/or any other factors.

An optimal uplink path between the user equipment 507 and one of the cell sites 502, 503 can be selected based on at least these factors.

Figure 5B:
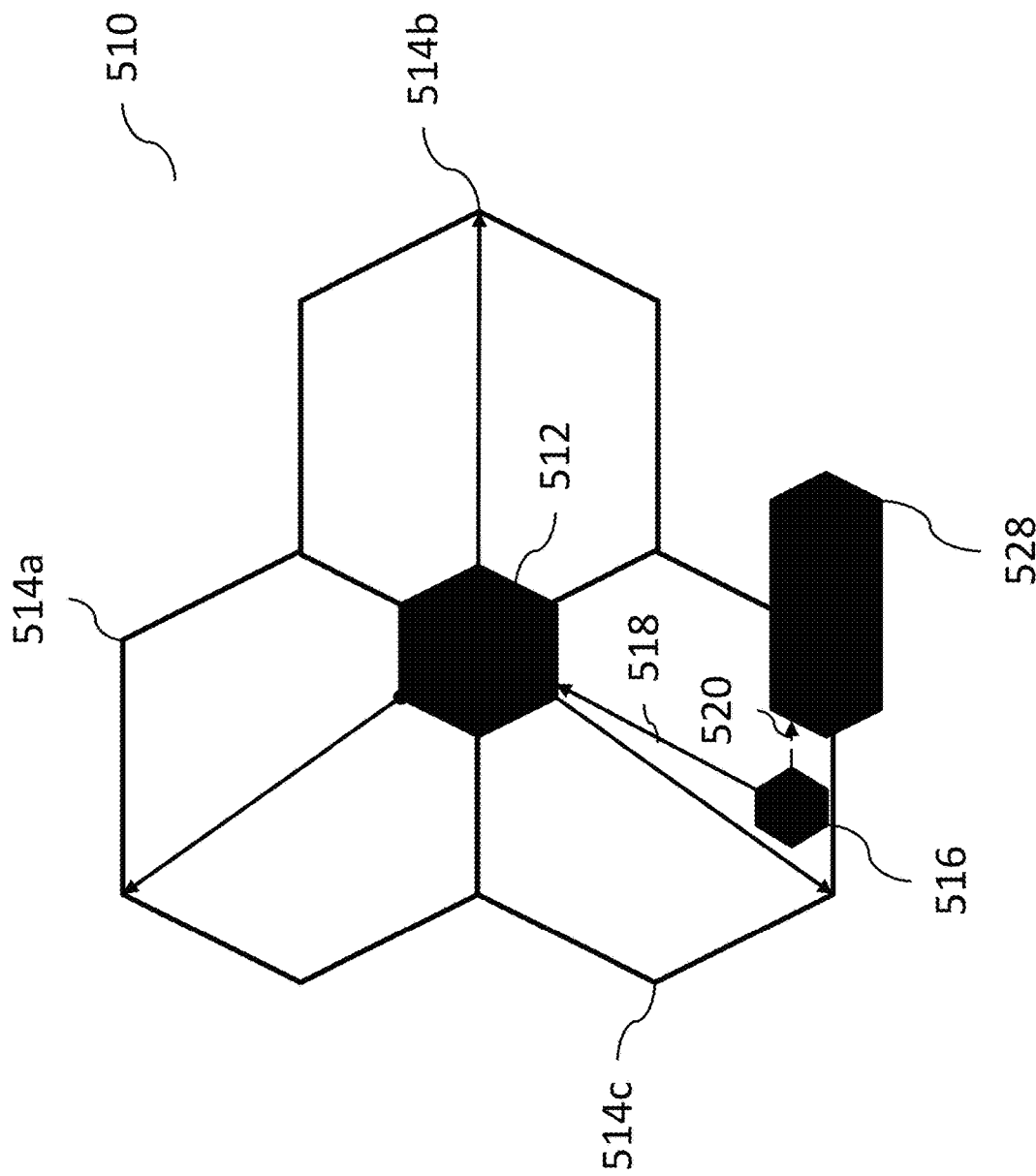

FIG. 5b illustrates an exemplary system 510 for controlling power consumption of a user equipment, according to some implementations of the current subject matter. The system 510 can include a cell site 512, which can be an eNodeB (as for example, shown in FIGS. 1a-4b and discussed above). The cell site 512 can be a macro cell site and/or can be any other type of site. Similar to the cell site 502, the cell site 512 can serve user equipments that can be located in one or more of the three sectors 514 (a, b, c).

As shown in FIG. 5b, the system 510 can be implemented as a heterogeneous network ("HetNet") and can include another cell site 528. The cell site 528 can be a site that can be the same size as the cell site 512 and/or smaller than the cell site 512. In some exemplary, non-limiting implementations, the cell site 528 can be a micro cell site and the cell site 512 can be a macro cell site. The sites 512, 528 can be any size. As shown in FIG. 5b, the micro cell site 528 can be at least partially located within one of the sectors 514c and/or can service an area that can overlap with one or more of the sectors 514 and/or can be located adjacent one or more of the sectors 514 without overlapping any of the sectors.

In some implementations, a user equipment 516 can be located in the sector 514c and can be communicating with the macro cell 512. The user equipment 516 can also be located adjacent to an edge of the sector 516c. The user equipment 516 can also be located proximate to the micro cell 528 and can be configured to communicate with the micro cell 528. The micro cell 528 can communicate with the macro cell 512 and/or can be associated and/or attached to the macro cell 512. In some implementations, the macro cell 512 and the micro cell 528 can be communicatively coupled using an interface that can provide communications between remote radio heads of the macro cell 512 and the micro cell 528 and/or any other remote radio heads using such interfaces. As such, the micro cell 528 can further act as a supporting radio for the macro cell 512. The macro cell 512 can also rely on other supporting radio from other cells that may be present.

In some implementations, once the user equipment 516 established a communication link with the micro cell 528, the user equipment 516 can continue communicating with the macro cell 512 on the downlink and can communicate with a macro cell 512 on uplink with support from the micro cell 528. This can reduce transmission power that may be required from the user equipment 516 to transmit on the uplink to the macro cell 512. Instead, the user equipment can conserve, and thus, reduce, its uplink transmission power by transmitting on the uplink to the micro cell 528.

In some implementations, once the user equipment 516 established a communication link with the micro cell 528, interference that is caused by having the user equipment 516 communicate on the uplink with the macro cell 512 can be reduced through the use of the CoMP technique, such as by using the radio of the micro cell 528 for uplink communications with the macro cell 512. The interference is typically caused due to transmission power imbalance between the macro cell 512 and the micro cell 528, where the transmission power required of the user equipment 516 to communicate with the macro cell is higher than the transmission power of the user equipment 516 that is required to communicate with the micro cell, thereby causing interference.

Figure 6:
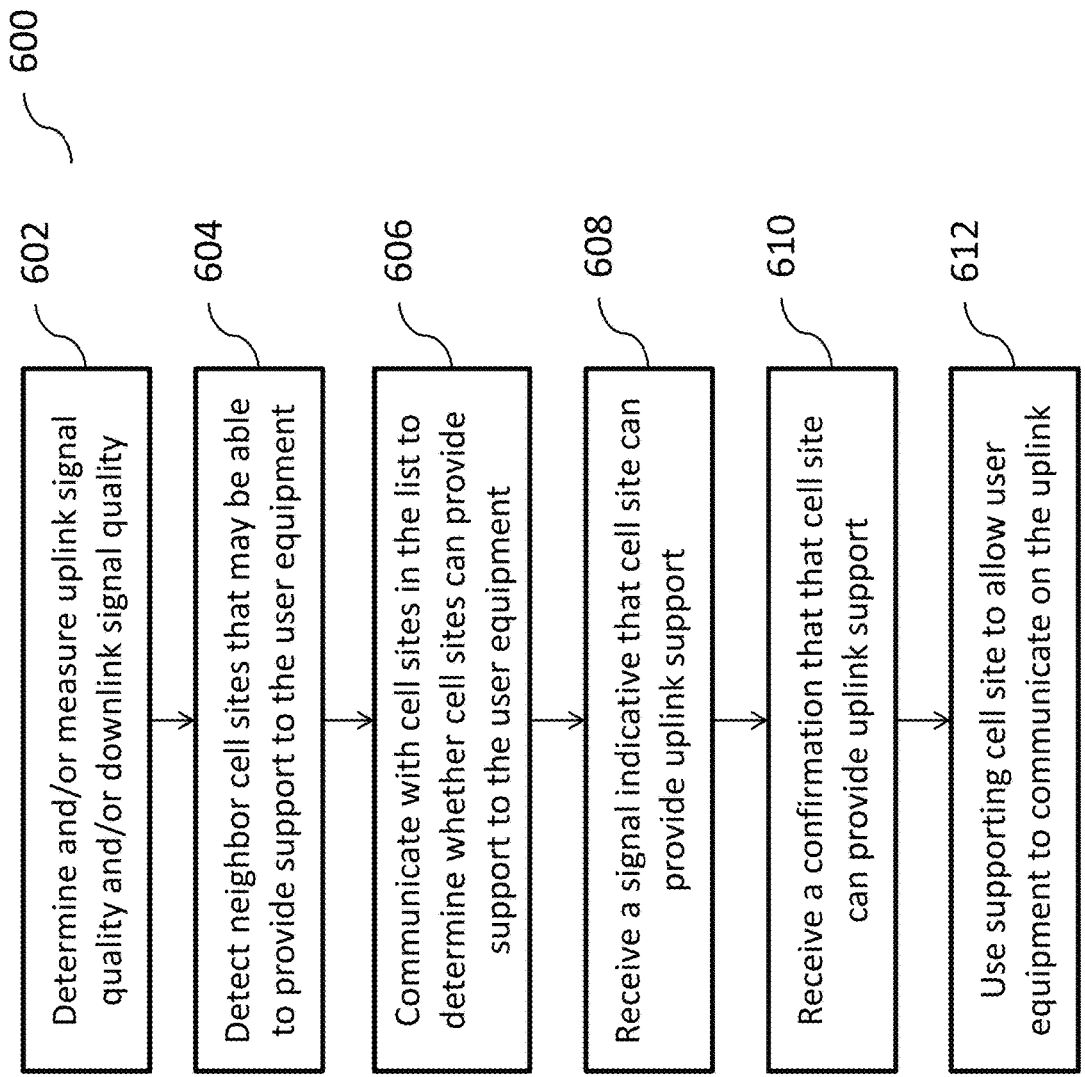
FIG. 6 illustrates an exemplary process for providing coordination among cell sites to improve throughput and reduce power consumption of a user equipment, according to some implementations of the current subject matter.

FIG. 6 illustrates an exemplary process 600 for providing coordination among cell sites to improve throughput and reduce power consumption of a user equipment, according to some implementations of the current subject matter. The process 600 can be used to establish communication between the user equipment 516 and the micro cell 528 (e.g., a supporting cell) (shown in FIG. 5b) for uplink purposes while maintaining downlink communication between the user equipment 516 and the macro cell 512 (e.g., a principal cell). This process can be applicable to heterogenous networks ("HetNet"), intra-site CoMP (e.g., between 504a and 504b sectors, as shown in FIG. 5a), and inter-site (e.g., between 504b and 505a sectors, as shown in FIG. 5a). At 602, the user equipment 516 can determine and/or measure uplink signal quality and/or downlink signal quality. The determined/measured qualities can be reported to the macro cell 512. Since one or more user equipments 516 can provide such report, a determination or an identification can be made, which user equipment 516 may require radio support (e.g., from an adjacent micro cell and/or any other type of cell).

At 604, the macro cell 512 can store a list of adjacent cells (e.g., macro cells, micro cells, etc.) that may be capable of providing radio support to the identified user equipment 516 that requires support. The list can be provided to the macro cell 512 by the network operator and/or the macro cell 512 can ascertain presence of other cell sites and make a determination whether any of these cell sites can be included on a list of cell sites that can provide support to the user equipment. The list can be updated based on a periodic basis, automatically, and/or manually. The cell sites identified on the list can be cell sites that are neighbors to the macro cell 512 and/or can be partially located within the area served by the macro cell 512 (e.g., micro cell 528). The macro cell 512 can use the list to detect neighbor cell sites that may be able to provide support to the user equipment.

At 606, the macro cell 512 can communicate with one or more cell sites identified in the list (e.g., micro cell 528) to determine whether any of the identified cell sites are capable of providing support to the user equipment 516. The macro cell 512 can use an interface between remote radio head to remote radio head to communicate with identified cell sites to determine their availability for support. In some implementations, the macro cell 512 can communicate only with the cell sites identified in the list. Further, in some implementations, each cell site can also contain a list of all other cell sites that can provide support to the user equipment 516, e.g., a neighbor cell site list. The list can be generated based on a discovery of all available neighbor cell sites at the time of initialization of a cell site and/or the system.

At 608, one or more of the cell sites contacted by the macro cell 512 can transmit to the macro cell 512 a signal indicative that it is capable of providing uplink support to the user equipment. The macro cell 512 can select one or more contacted cell sites for the purposes of providing uplink support to the user equipment. In some implementations, the macro cell 512 can select cell sites based on a report that it received from a user equipment 516. In some exemplary implementations, a maximum and/or a minimum number of cell sites that can provide support to the user equipment can be determined by the macro cell site. The macro cell site can also determine one or more "best" cell site(s) for providing support to the user equipment based on the user equipment's list of cell sites. The determination of "best cell site(s) can be based on downlink channel conditions that are reported by the user equipment and/or the uplink condition, as measured on one or more supporting nodes. Alternatively, and/or in addition to, the determination of such cell sites can also be based on latency, bandwidth allowed between cell sites, and/or any other parameters, and/or any combination thereof.

At 610, the identified supporting cell site (e.g., micro cell 528) can confirm its availability for the purposes of providing support. Once the macro cell 512 receives confirmation of availability of support from the supporting cell site (e.g., micro cell 528), every time physical uplink shared channel ("UL PUSCH") allocation is made, the macro cell 512 can communicate the UL PUSCH allocation to the selected supporting cell site (e.g., micro cell 528). As such, equalized symbols from the supporting cell site can be transmitted to the macro cell 512 prior to completion of detection and decoding at the macro cell 512.

Once the link between the macro cell 512 and the supporting cell site (e.g., micro cell 528) is confirmed, the supporting cell site and the user equipment 506 can communicate on the uplink and the user equipment 506 and the macro cell 512 can continue communicating on the downlink, at 612. This can control power consumed by the user equipment on the uplink, improve reception of uplink signal (s) and reduce interference caused by the user equipment. In some implementations, use of supporting cell sites can be particularly useful in dense deployment scenarios (e.g., areas having a substantial number of cell sites, such as, metropolitan areas), where uplink performance can be affected due to low SINR. Thus, having a substantial number of supporting cell sites in dense deployment scenarios can further reduce costs that can be associated with remote radio head to remote radio head interfaces as well as improve coordination among cell sites due to close proximity of cell sites to each other.

Further, the current subject matter can provide one or more of the following advantages. In particular, the current subject matter can improve uplink throughput for user equipments that are communicating on the uplink using supporting cell sites. The current subject matter is not restricted to specific locations of the supporting cell sites, thereby allowing more user equipments to benefit from use of supporting cell sites and improve their uplink throughput. Also, the current subject matter can reduce user equipment's consumption of transmission power, thereby improving battery life of the user equipment.

Figure 7:
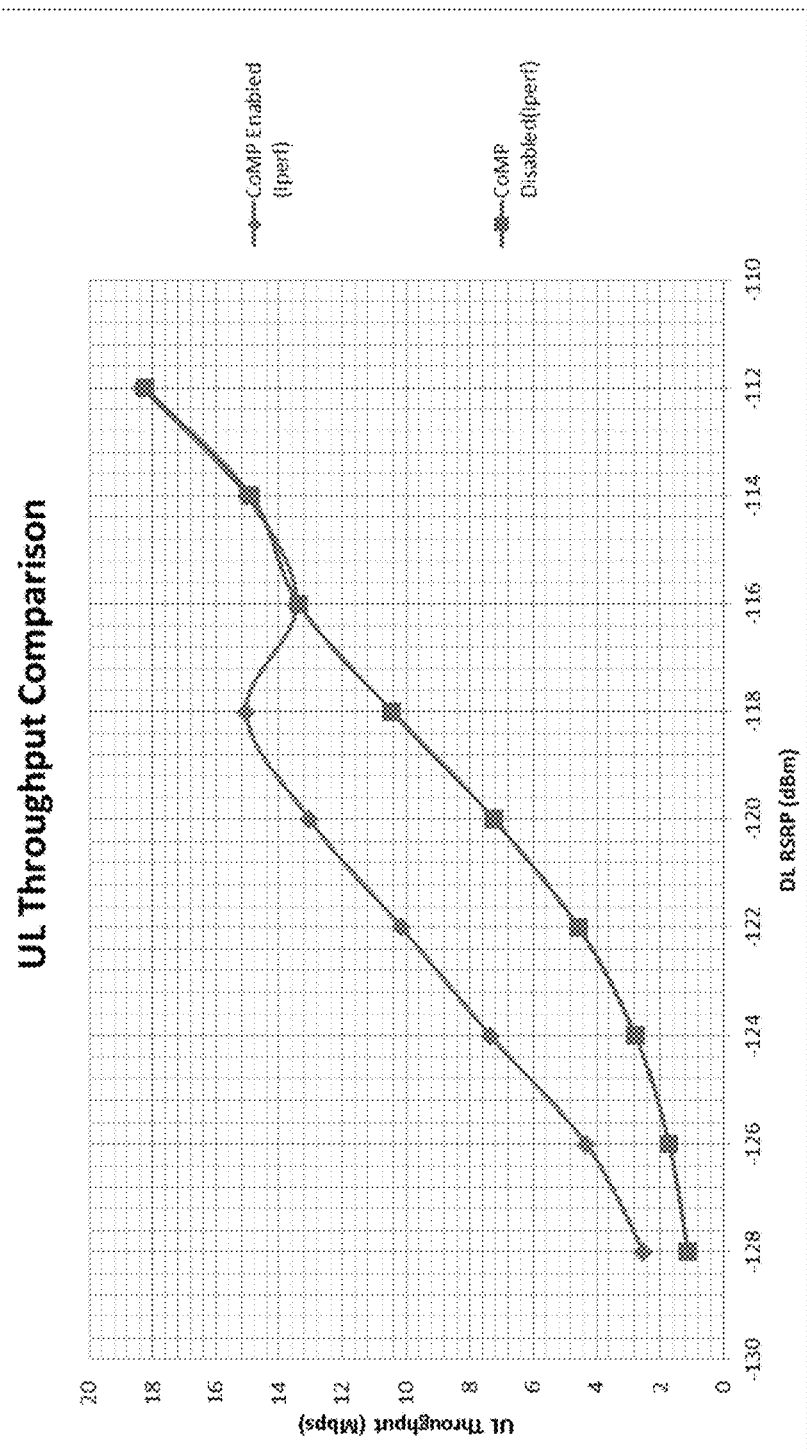
FIG. 7 illustrates an exemplary plot showing an uplink throughput comparison between conventional systems and current subject matter system having enabled power control capabilities.

FIG. 7 illustrates an exemplary plot 700 showing an uplink throughput comparison between conventional systems and current subject matter system having enabled CoMP capabilities, according to some implementations of the current subject matter. As can be seen from plot 700, an uplink throughput can be significantly improved (as shown by the "diamonds" curve) once a supporting cell site is identified and used for the purposes of uplink communications.

Figure 8:
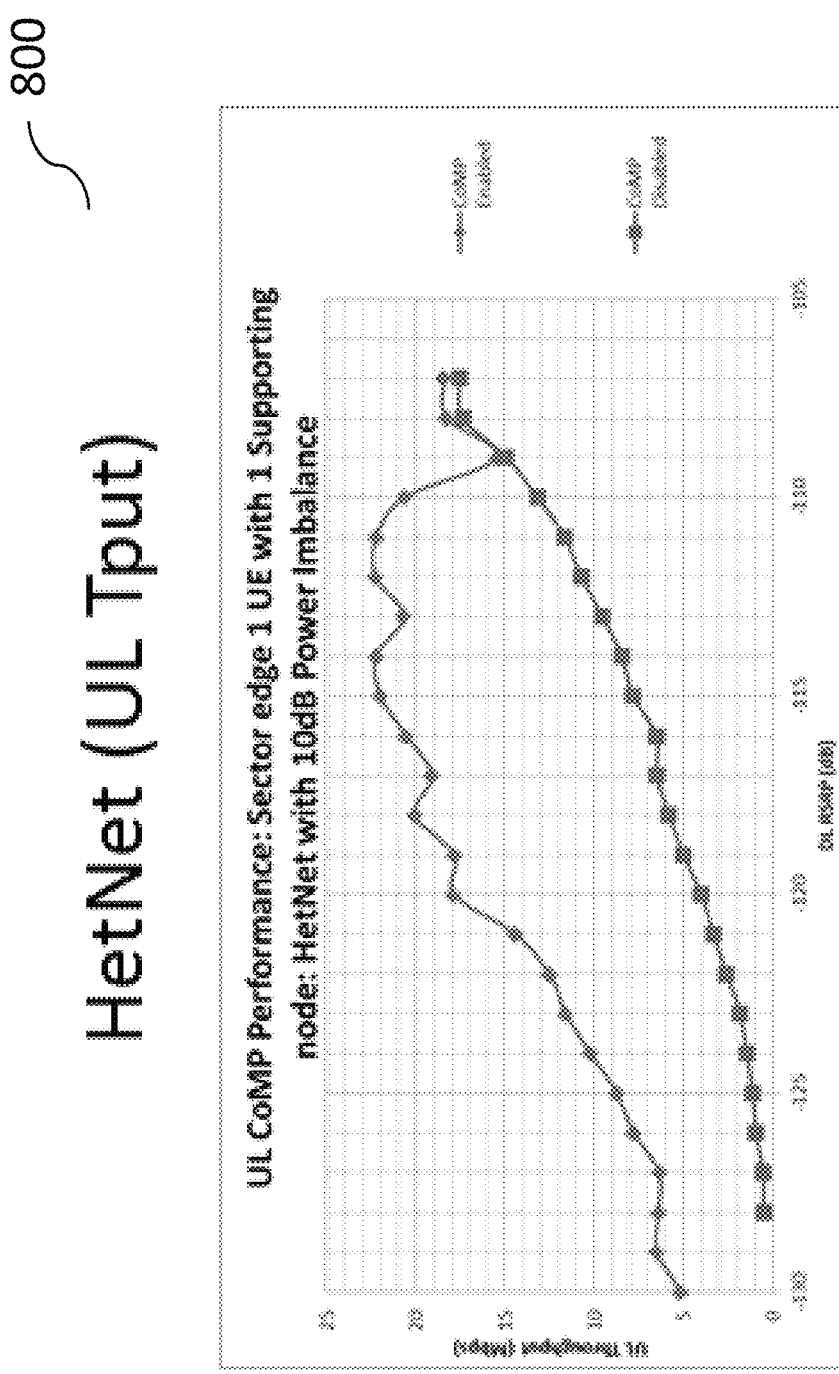
FIG. 8 illustrates an exemplary plot showing an uplink throughput in heterogeneous networks comparison between conventional systems and current subject matter system having enabled power control capabilities.

FIG. 8 illustrates an exemplary plot 800 showing an uplink throughput in heterogeneous networks comparison between conventional systems and current subject matter system having enabled power control capabilities, according to some implementations of the current subject matter. As shown in FIG. 8, the experimental measurements of uplink throughput ("UL Tput") were taken in a heterogeneous network ("HetNet") that included one user equipment ("UE") located at an edge of a sector (similar user equipment 516 shown in FIG. 5*b*) supported by one cell, e.g., a macro cell, and one supporting cell site (e.g., micro cell 528 shown in FIG. 5*b*). For the purposes of this exemplary implementation, a power imbalance between the macro cell and the supporting cell site was set at 10 dB. As is shown, an uplink throughput performance can be significantly improved when current subject matter's CoMP features are enabled (shown by the "diamond" curve).

Figure 9:
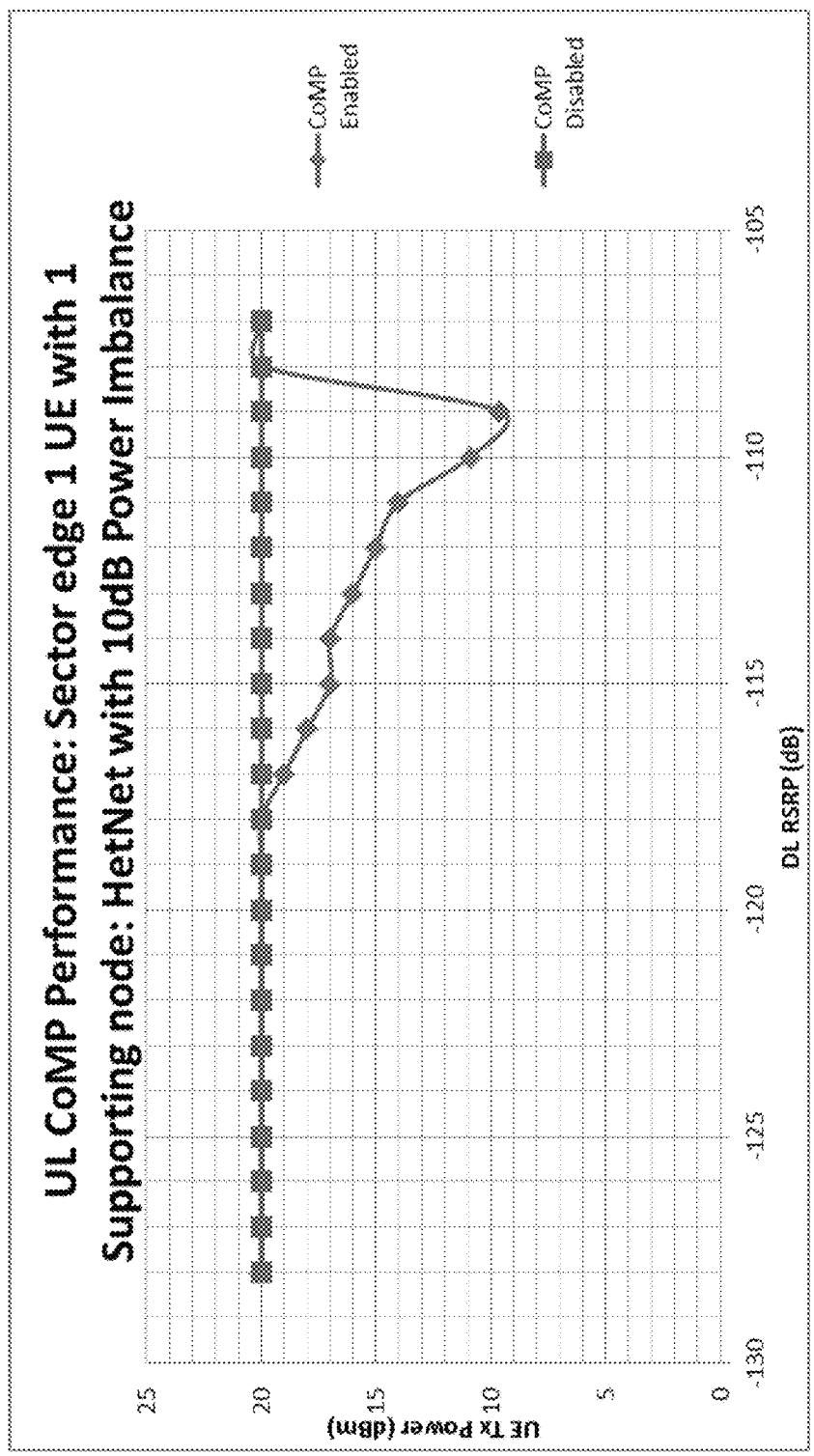
FIG. 9 illustrates an exemplary plot showing an uplink coordinated multipoint performance comparison between conventional systems and current subject matter system having enabled power control capabilities.

FIG. 9 illustrates an exemplary plot 900 showing an uplink coordinated multipoint performance comparison between conventional systems and current subject matter system having enabled power control capabilities, according to some implementations of the current subject matter. The experimental setup for the measurements shown in FIG. 9 is similar to the experimental setup for the measurements shown in FIG. 8. As illustrated, with the current subject matter's CoMP features being enabled, the user equipment's transmit power (in dBm) can be reduced (as shown by the "diamond" curve).

Figure 10:
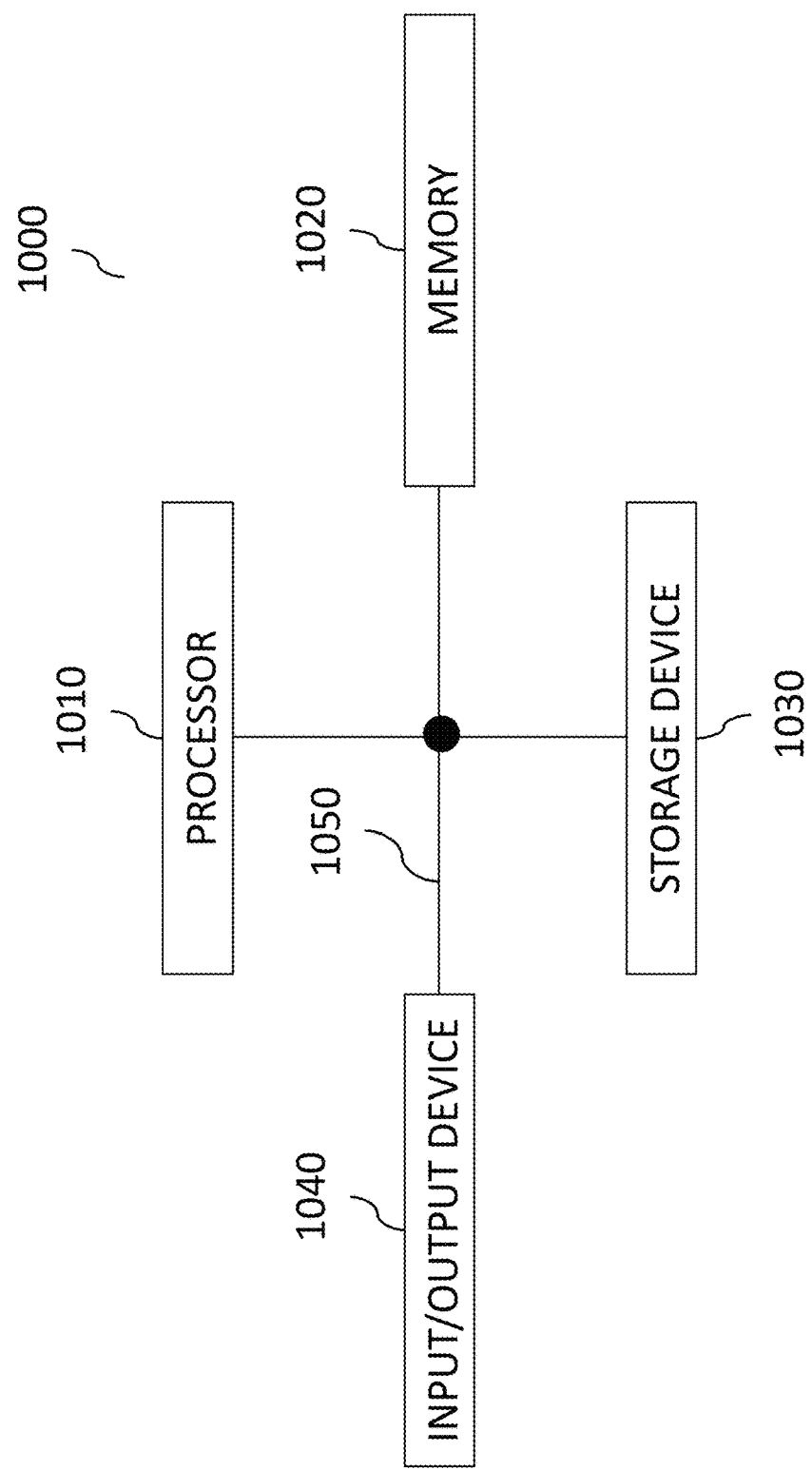
FIG. 10 illustrates an exemplary system, according to some implementations of the current subject matter.

In some implementations, the current subject matter can be configured to be implemented in a system 1000, as shown in FIG. 10. The system 1000 can include one or more of a processor 1010, a memory 1020, a storage device 1030, and an input/output device 1040. Each of the components 1010, 1020, 1030 and 1040 can be interconnected using a system bus 1050. The processor 1010 can be configured to process instructions for execution within the system 600. In some implementations, the processor 1010 can be a single-threaded processor. In alternate implementations, the processor 1010 can be a multi-threaded processor. The processor 1010 can be further configured to process instructions stored in the memory 1020 or on the storage device 1030, including receiving or sending information through the input/output device 1040. The memory 1020 can store information within the system 1000. In some implementations, the memory 1020 can be a computer-readable medium. In alternate implementations, the memory 1020 can be a volatile memory unit. In yet some implementations, the memory 1020 can be a non-volatile memory unit. The storage device 1030 can be capable of providing mass storage for the system 1000. In some implementations, the storage device 1030 can be a computer-readable medium. In alternate implementations, the storage device 1030 can be a floppy disk device, a hard disk device, an optical disk device, a tape device, non-volatile solid state memory, or any other type of storage device. The input/output device 1040 can be configured to provide input/output operations for the system 1000. In some implementations, the input/output device 1040 can include a keyboard and/or pointing device. In alternate implementations, the input/output device 1040 can include a display unit for displaying graphical user interfaces.

Figure 11:
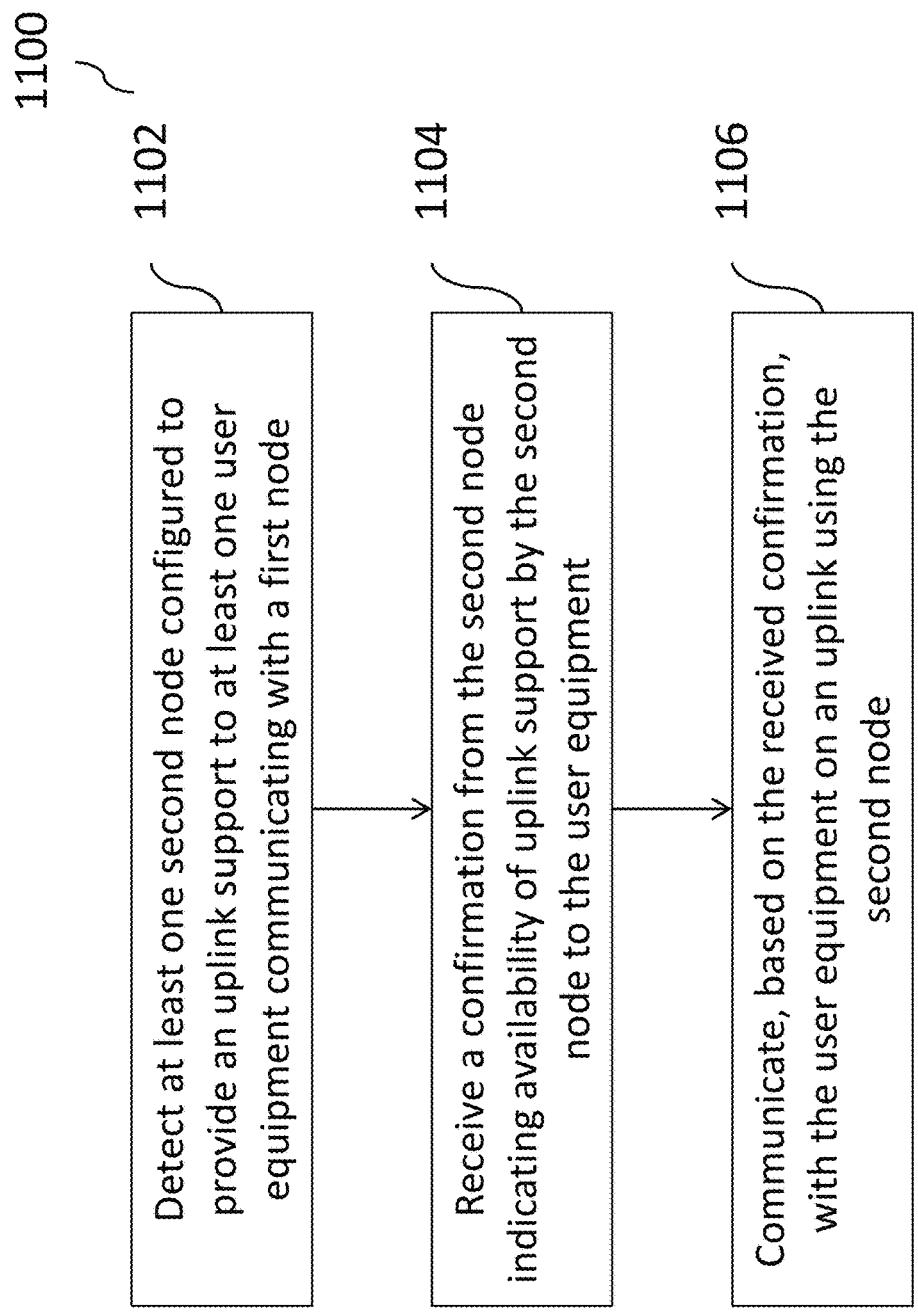
FIG. 11 illustrates an exemplary method, according to some implementations of the current subject matter.

FIG. 11 illustrates an exemplary method 1100 for coordinating uplink transmissions, according to some implementations of the current subject matter. At 1102, a first node (e.g., a macro base station 512 shown in FIG. 5*b*) can detect at least one second node (e.g., micro base station 528 shown in FIG. 5*b*) that can be configured to provide an uplink support to at least one user equipment (e.g., user equipment 516) that is communicating with the first node. At 1104, the first node can receive a confirmation from the second node indicating availability of uplink support by the second node to the user equipment. At 1106, the first node and the user equipment can communicate with one another on an uplink using the second node.

In some implementations, the current subject matter can include one or more of the following optional features. The first node and the second node can be evolved node B base stations having a base band unit and a remote radio head.

In some implementations, the first node can detect the second node based on a list of available second nodes (e.g., neighbor cells, which do not need to be co-located). The list can be, but not necessarily, stored by the first node (and/or provided and/or determined by the first node and/or provided/determined by any other entity (e.g., configuration authority)).

In some implementations, at least one of the detecting and the receiving can be performed using a communication interface between a remote radio head of the first base station and the second base station using a coordinated multipoint transmission. The communication between the first node and the user equipment using the second node can reduce transmission power of the user equipment using the uplink support provided by the second node. Such communication can also reduce interference caused by the user equipment and affecting the second node.

In some implementations, the detection can be performed based on a signal received by the first node requesting the uplink support for the user equipment.

In some implementations, the first node and the user equipment can be configured to communicate on a downlink while communicating on the uplink using the second node.

In some implementations, the first node and the second node can be at least one of the following: a macro base station, a micro base station, a femto base station, a pico base station, and any combination thereof. The first node and the second node can be not co-located.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
identifying, using a first node, at least one available second node in a plurality of second nodes providing an uplink support to at least one user equipment communicating with the first node, the at least one available second node is identified using a combination of communication parameters, the identifying being executed using an interface established between a remote radio head of the first node and respective remote radio heads of one or more second nodes in the plurality of second nodes, wherein the communication parameters include: a latency allowed between the first node and one or more second nodes, a bandwidth allowed between the first node and one or more second nodes, received signal quality reports on the uplink as measured by the one or more second nodes, and signal quality reports on the downlink as reported by one or more user equipments in the plurality of user equipments;
transmitting, using the first node, physical uplink shared channel allocation to the identified second node upon receiving, by the first node, a confirmation from the at least one identified second node indicating availability of uplink support by the at least one identified second node to the at least one user equipment; and
communicating, based on the received confirmation, using the first node, with the at least one user equipment on a downlink and an uplink, the identified second node providing communication support on the uplink.

2. The method according to claim 1, wherein the first node and the at least one second node are evolved node B nodes having a base band unit and a remote radio head.

3. The method according to claim 1, wherein the first node and one or more second nodes in the plurality of second nodes are part of a heterogeneous network.

4. The method according to claim 1, wherein the identifying is performed using a coordinated multipoint transmission.

5. The method according to claim 1, wherein the one or more communication parameters include at least one of the following: a downlink channel condition reported by the at least one user equipment, an uplink channel condition reported by the at least one user equipment, an ability of the first node and/or one or more second nodes to support communication with the user equipment, and any combination thereof.

6. The method according to claim 1, wherein the communicating is further configured to reduce at least one of the following:
a transmission power of the at least one user equipment using the uplink support provided by the at least one second node; and
an interference caused by the at least one user equipment and affect the at least one second node using the uplink support provided by the at least one second node.

7. The method according to claim 1, wherein the at least one user equipment is located at at least one of the following: an edge of a sector served by the first node, an edge of a sector served by one or more second nodes, inside a sector served by one or more of the first node, inside a sector served by one or more second nodes, away from an edge of a sector served by the first node, and away from an edge of a sector served by one or more second nodes.

8. The method according to claim 1, wherein the first node and the at least one second node include at least one of the following: a macro base station, a micro base station, a femto base station, a pico base station, and any combination thereof.

9. The method according to claim 1, wherein the first node and the at least one second node are not co-located.

10. A system comprising:
at least one programmable processor; and
a machine-readable medium storing instructions that, when executed by the at least one programmable processor, cause the at least one programmable processor to perform operations comprising:
identifying, using a first node, at least one available second node in a plurality of second nodes providing an uplink support to at least one user equipment communicating with the first node, the at least one available second node is identified using at least a combination of communication parameters, the identifying being executed using an interface established between a remote radio head of the first node and respective remote radio heads of one or more second nodes in the plurality of second nodes, wherein the communication parameters include: a latency allowed between the first node and one or more second nodes, a bandwidth allowed between the first node and one or more second nodes, received signal quality reports on the uplink as measured by the one or more second nodes, and signal quality reports on the downlink as reported by one or more user equipments in the plurality of user equipments;
transmitting, using the first node, physical uplink shared channel allocation to the identified second node upon receiving, by the first node, a confirmation from the at least one identified second node indicating availability of uplink support by the at least one identified second node to the at least one user equipment; and
communicating, based on the received confirmation, using the first node, with the at least one user equipment on a downlink and an uplink, the identified second node providing communication support on the uplink.

11. The system according to claim 10, wherein the first node and the at least one second node are evolved node B nodes having a base band unit and a remote radio head.

12. The system according to claim 10, wherein the first node and one or more second nodes in the plurality of second nodes are part of a heterogeneous network.

13. The system according to claim 10, wherein the identifying is performed using a coordinated multipoint transmission.

14. The system according to claim 10, wherein the one or more communication parameters include at least one of the following: a downlink channel condition reported by the at least one user equipment, an uplink channel condition reported by the at least one user equipment, an ability of the first node and/or one or more second nodes to support communication with the user equipment, and any combination thereof.

15. The system according to claim 10, wherein the communicating is further configured to reduce at least one of the following:
a transmission power of the at least one user equipment using the uplink support provided by the at least one second node; and
an interference caused by the at least one user equipment and affect the at least one second node using the uplink support provided by the at least one second node.

16. The system according to claim 10, wherein the at least one user equipment is located at at least one of the following: an edge of a sector served by the first node, an edge of a sector served by one or more second nodes, inside a sector served by one or more of the first node, inside a sector served by one or more second nodes, away from an edge of a sector served by the first node, and away from an edge of a sector served by one or more second nodes.

17. The system according to claim 10, wherein the first node and the at least one second node include at least one of the following: a macro base station, a micro base station, a femto base station, a pico base station, and any combination thereof.

18. The system according to claim 10, wherein the first node and the at least one second node are not co-located.

19. A computer program product comprising a non-transitory machine-readable medium storing instructions that, when executed by at least one programmable processor, cause the at least one programmable processor to perform operations comprising:
identifying, using a first node, at least one available second node in a plurality of second nodes providing an uplink support to at least one user equipment communicating with the first node, the at least one available second node is identified using at least a combination of communication parameters, the identifying being executed using an interface established between a remote radio head of the first node and respective remote radio heads of one or more second nodes in the plurality of second nodes, wherein the communication parameters include: a latency allowed between the first node and one or more second nodes, a bandwidth allowed between the first node and one or more second nodes, received signal quality reports on the uplink as measured by the one or more second nodes, and signal quality reports on the downlink as reported by one or more user equipments in the plurality of user equipments;
transmitting, using the first node, physical uplink shared channel allocation to the identified second node upon receiving, by the first node, a confirmation from the at least one identified second node indicating availability of uplink support by the at least one identified second node to the at least one user equipment; and
communicating, based on the received confirmation, using the first node, with the at least one user equipment on a downlink and an uplink, the identified second node providing communication support on the uplink.

20. The computer program product according to claim 19, wherein the first node and the at least one second node are evolved node B nodes having a base band unit and a remote radio head.

* * * * *